US012794129B2

(12) United States Patent
MacGougan et al.

(10) Patent No.: US 12,794,129 B2
(45) Date of Patent: Nov. 10, 2026

(54) RECEIVER STATE BASED ANTENNA TUNING

(71) Applicant: Apple Inc., Cupertino, CA (US)

(72) Inventors: Glenn D. MacGougan, San Jose, CA (US); Richard Najarian, Palos Verdes, CA (US); Aditya N. Srivastava, Fremont, CA (US); Rajesh Bezawada, Santa Clara, CA (US); Thomas E. Biedka, San Jose, CA (US)

(73) Assignee: Apple Inc., Cupertino, CA (US)

(*) Notice: Subject to any disclaimer, the term of this patent is extended or adjusted under 35 U.S.C. 154(b) by 115 days.

(21) Appl. No.: 18/666,620

(22) Filed: May 16, 2024

(65) Prior Publication Data

US 2024/0413537 A1 Dec. 12, 2024

Related U.S. Application Data

(60) Provisional application No. 63/507,436, filed on Jun. 9, 2023.

(51) Int. Cl.
*G01S 19/24* (2010.01)
*H01Q 1/02* (2006.01)
(Continued)

(52) U.S. Cl.
CPC ............. *H01Q 9/0442* (2013.01); *H01Q 1/02* (2013.01); *H01Q 1/241* (2013.01); *H04W 64/003* (2013.01)

(58) Field of Classification Search
CPC .......... H01Q 1/24; H01Q 1/241; H01Q 1/247; H01Q 1/273; H01Q 1/288; H01Q 9/0442;
(Continued)

(56) References Cited

U.S. PATENT DOCUMENTS 12,019,167 B2* 6/2024 Pon .......................... G01S 19/22
2009/0278735 A1* 11/2009 Jin .......................... G01S 19/25
701/470
(Continued)

FOREIGN PATENT DOCUMENTS

EP 2120061 B1 3/2011

OTHER PUBLICATIONS

International Search Report and Written Opinion issued in PCT Application No. PCT/US2024/031317, dated Feb. 25, 2025 in 21 pages.
(Continued)

*Primary Examiner* — Thai Pham
(74) *Attorney, Agent, or Firm* — KILPATRICK TOWNSEND & Stockton LLP

(57) ABSTRACT

In some implementations, the disclosed techniques may include tuning a first antenna element to a first tuning state during an acquisition mode for establishing communication channels with satellites. The first tuning state can configure the first antenna element to receive signals in a first frequency range. The techniques may include establishing the communication channels using the first antenna element in the first tuning state during the acquisition mode. The techniques may include transitioning from the acquisition mode to a tracking mode. The techniques may include changing the tuning state of the first antenna element. The techniques may include determining a location of the mobile device during the tracking mode: (1) using the first antenna element and a second antenna element of the mobile device or (2) not using the first antenna element and using the second antenna element that is configured to receive signals in a second frequency range.

20 Claims, 12 Drawing Sheets

(51) Int. Cl.
*H01Q 1/24* (2006.01)
*H01Q 9/04* (2006.01)
*H04W 64/00* (2009.01)

(58) Field of Classification Search
CPC .......... G01S 19/01; G01S 19/24; G01S 19/32; G01S 19/34; G01S 19/36; G01S 19/37
See application file for complete search history.

(56) References Cited

U.S. PATENT DOCUMENTS

2012/0274509 A1* 11/2012 Tsai .......................... G01S 19/34 342/357.35
2014/0333477 A1* 11/2014 Lennen ................... G01S 19/24 342/357.65
2015/0271764 A1* 9/2015 Agrawal ............. H04W 52/223 455/522
2017/0177045 A1 6/2017 Seo et al.
2022/0283551 A1* 9/2022 Atmatzakis ............ H01Q 5/321
2022/0291395 A1* 9/2022 Iyengar .................... H01Q 9/42

OTHER PUBLICATIONS

Lennen, et al. "Deep Integration of GNSS Receiver Functions into High Volume Platforms," GNSS 2019, Proceedings of the 32nd International Technical Meeting of the Satellite Division of the Institute of Navigation (Ion Gnss+ 2019); Institute of Navigation, dated Sep. 20, 2019 in 3 pages.
Invitation to Pay Additional Fees and, Where Applicable, Protest Fee in PCT Application No. PCT/US2024/031317, dated Oct. 10, 2024 in 11 pages.
Turetzky, et al., A Pure L5 Mobile Receiver, Inside GNSS, dated Sep. 30, 2020 in 8 pages.
International Preliminary Report on Patentability issued in PCT Application PCT/US2024/031317, dated Dec. 18, 2025 in 16 pages.

* cited by examiner

400

RECEIVER STATE BASED ANTENNA TUNING

CROSS-REFERENCES TO RELATED APPLICATIONS

This application claims priority to U.S. Provisional Application No. 63/507,436, for "RECEIVER STATE BASED ANTENNA TUNING" filed on Jun. 9, 2023, which is herein incorporated by reference in its entirety for all purposes.

FIELD

The present disclosure relates generally to techniques for using communication devices with a global navigation satellite system (GNSS).

BACKGROUND

A mobile device can use signals from a global navigation satellite system (GNSS) for navigation and other location-based functionality. The device can calculate time of flight of these signals to determine the device's location relative to the satellites. The mobile device may use different antennas to implement this location-based functionality. For example, some phones have an L1 antenna as well as an L5 antenna, which provides increased accuracy. Although they use different frequencies, the antennas can interfere with each other, and thus their tuning may not be independent of each other.

Acquiring these signals, and calculating the time of flight, can require precise timing, and temperature fluctuations during a GNSS acquisition stage can result in inaccurate timing information. Mobile devices use a crystal oscillator as a clock; the oscillator's frequency and the clock's accuracy can vary with temperature changes. Accordingly, the time to acquire GNSS navigation signals can be improved by stabilizing the mobile device's temperature during GNSS signal acquisition. Accordingly, improvements to GNSS communication are desirable.

BRIEF SUMMARY

Certain embodiments are directed to techniques (e.g., a device, a method, a memory or non-transitory computer readable medium storing code or instructions executable by one or more processors) for localization of a mobile device. The mobile device's position can be determined relative to one or more satellites as part of a global navigation satellite system (GNSS). GNSS navigation can be divided into a signal acquisition mode and signal tracking mode. In the acquisition mode, the mobile device searches in code and frequency space to acquires a signal from one or more GNSS satellites. In the tracking mode, the mobile device continues to track the acquired signal by small adjustments in code delay and frequency changes using code and frequency tracking loops. Different signal types can be suited to different GNSS navigation modes and tuning a tracked device's antennas to different frequency ranges during GNSS navigation can change the tracked devices' performance. Signals from some frequency ranges may be more energy efficient to process than signals from other frequency ranges.

Temperature changes can influence a tracked device's performance during GNSS navigation. The device can control processes executing on the mobile device to stabilize the device's temperature. The processes may be assigned a thermal priority, and these priorities can be used to predict or control the device's thermal state. In addition, the tracked device may change signal types depending on the devices current or projected thermal state.

In one general aspect, techniques may include tuning a first antenna element of the mobile device to a first tuning state during an acquisition mode for establishing communication channels with a plurality of satellites, where the first tuning state configures the first antenna element to receive signals in a first frequency range. Techniques may also include establishing the communication channels using the first antenna element in the first tuning state during the acquisition mode. Techniques may furthermore include transitioning from the acquisition mode to a tracking mode. Techniques may in addition include changing the tuning state of the first antenna element. Techniques may moreover include during the tracking mode, determining a location of the mobile device (1) using the first antenna element and a second antenna element of the mobile device or (2) not using the first antenna element and using the second antenna element that is configured to receive signals in a second frequency range. Other embodiments of this aspect include corresponding methods, computer systems, apparatus, and computer programs recorded on one or more computer storage devices, each configured to perform the actions of the techniques.

In one general aspect, the techniques may include storing, by a thermal manager, a set of one or more thermal processes that are identified as causing a temperature of the mobile device to fluctuate. The techniques may also include receiving, at the thermal manager, a notification that an acquisition stage of a GNSS circuit is scheduled during a first time period. The techniques may furthermore include identifying, by the thermal manager, a first subset of the set of one or more thermal processes, where the thermal processes of the first subset are each scheduled to change a respective execution state during the first time period. The techniques may in addition include controlling, by the thermal manager, the respective execution state of each of the first subset to stabilize the temperature of the mobile device until a conclusion of the first time period.

These and other embodiments of the disclosure are described in detail below. For example, other embodiments are directed to systems, devices, computer program products, and non-transitory computer readable media associated with methods described herein.

A better understanding of the nature and advantages of embodiments of the present invention may be gained with reference to the following detailed description and the accompanying drawings.

DETAILED DESCRIPTION

Figure 1:
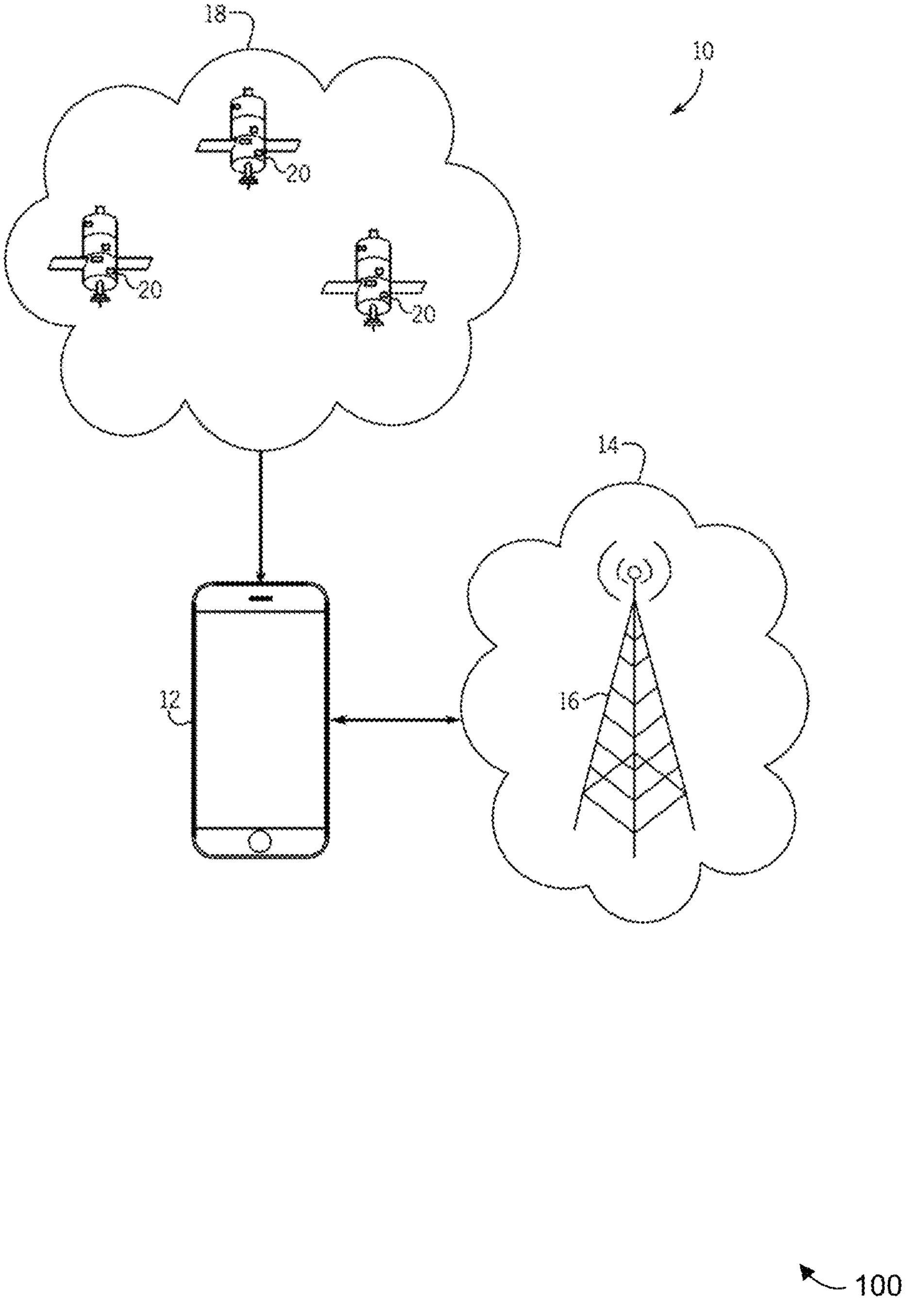
FIG. 1 is a schematic diagram of a communication system according to various embodiments.

Certain embodiments are directed to techniques (e.g., a device, a method, a memory or non-transitory computer readable medium storing code or instructions executable by one or more processors) for determining a location of a mobile device using other devices, such as satellites.

Electromagnetic signals, such as radio waves, can be received at an electronic device's antenna element (e.g., part of an antenna or the entirety of the antenna itself). Upon reception, the received waves can induce an electric current, which transform the information in the electromagnetic signal to a format that the electronic device can interpret. The antenna element can be optimized for the reception of specific wavelengths of electromagnetic signals.

This optimization, or tuning, of the antenna element can involve connecting the antenna element to inductors and/or capacitors (e.g., radio frequency (RF) circuitry, also referred to as an RF chain) to minimize the antenna's reactance for an induced electric current at a particular frequency range. The electric current generated at the antenna element by the received signals is an alternating current, and reactance is non-resistive opposition to alternating current. By connecting the appropriate bank of inductors and capacitors to the antenna, the electronic device can increase the strength of the electrical current by canceling out the antenna's reactance.

The electronic device may be able to receive different signal types in order to perform GNSS navigation or other location-based functionality. Thus, a device may include multiple antenna elements that are configured to receive wireless signals. The tuning of an antenna can include tuning one or more antenna elements. Tuning the antenna can change an antenna element's affinity for signals at different ranges of frequencies but increasing the antenna's affinity for one range of frequencies can reduce the antenna's affinity for other ranges. For example, tuning a first antenna element (or antenna) of a device for a first frequency range can reduce the reception of a second antenna element (or antenna) of the device for a second frequency range, different from the first frequency range.

GNSS navigation can be divided into a signal acquisition mode and signal tracking mode. In the acquisition mode, the mobile device searches in code and frequency space to acquires a signal from one or more GNSS satellites. In the tracking mode, the mobile device continues to track the acquired signal by small adjustments in code delay and frequency changes using code and frequency tracking loops.

Different signal types (operating at different frequencies) may perform better in different modes. Some embodiments can take advantage and use different antenna elements at different modes, e.g., a particular antenna can be used exclusively during one mode. In this manner, the particular antenna element can be optimally tuned during one mode without concerns of interference from another antenna. For example, a first antenna element can be tuned and used exclusively for an acquisition mode, thereby making the acquisition more efficient.

As mentioned above, different signal types may be desirable for acquisition and tracking. For instance, L1 signals can be useful for acquisition (compared to L5 signals which can have 10× chipping rate), but L5 signals may allow for more precise tracking (with a significantly narrower auto-correlation peak). Accordingly, the mobile device can tune the antenna element for different frequency ranges based on the current GNSS navigation mode (e.g. L1 for initial signal acquisition and L5 or L1 and L5 for tracking).

In addition, processing some signal types may be more energy demanding for the mobile device. As a result, the mobile device may save energy by tuning for signals that require less energy to process. For example, processing L5 signals can be more demanding than processing L1 signals. Accordingly, it may be advantageous for a mobile device to tune its antenna element.

There are also other circumstances where it may be desirable to tune the antenna element for different frequency ranges. For example, some frequency ranges may be resistant to errors caused by thermal events at the mobile device. Such errors can be caused by inaccurate oscillator readings caused by the temperature change. A thermal event (e.g., a thermal state) can occur when the mobile device's oscillating elements are operating at a higher temperature than normal or the device's temperature is unstable (e.g., the rate of change in temperature is above a threshold). Accordingly, the mobile device may be able to mitigate tracking errors caused by a thermal event by tuning the antenna element to a thermal event resistant frequency range.

Thermal management techniques can be used to mitigate errors from inaccurate oscillator readings caused by thermal states. The acquisition mode of GNSS navigation can require precise timing, and temperature fluctuations during signal acquisition can cause delays during signal acquisition. Integrated circuits, and other computer components, can use oscillators as a clock. The frequency of these oscillators can vary with temperature, and changes in temperature can make frequency-based timing measurements difficult. An oscillator's frequency at a particular temperature can be known, and a lookup table can be used to calculate a relationship between the oscillator's frequency and time at a particular temperature. Accordingly, reliable timing can be achieved at elevated temperatures as long as the temperature is stable. Unstable temperatures can complicate using the oscillator's frequency to measure time because higher order derivatives of temperature, rather than one stable temperature measurement, may be needed to calculate the changing frequency.

The time to acquire a GNSS signal can be improved by stabilizing the mobile devices' temperature. To prepare for GNSS signal acquisition, processes that cause the mobile device's temperature to change can be identified and their execution can be delayed until after the signal has been acquired. These thermal processes can be any activity of the mobile device that is known to change the oscillator's temperature. For example, the use of power amplifiers located near the oscillator can increase the oscillator's temperature. Alternatively, canceling the use of active amplifiers can cause the oscillator's temperature to decrease. Accordingly, signal acquisition time can be improved through the management of thermal processes.

Thermal management can include assigning a thermal score to processes executing on the mobile device. A thermal score can identify an expected change in temperature caused by the execution of a particular process. The thermal score can be binary (e.g., 0 for non-thermal processes and 1 for thermal processes), or the thermal score can include categories for different thermal processes. The thermal score can correspond to an expected change in temperature caused by a process' execution, and, for example, the thermal score can correspond to a rate of temperature change caused during the execution. In addition, or alternatively, the thermal score may include a magnitude of temperature chance caused by the successful execution of a process (e.g., process A corresponds to a five-degree Celsius increase in temperature).

Thermal management to improve thermal stability can include cancelling executing or queued processes based on their thermal score. For example, a thermal manager may cancel thermal processes in anticipation of an attempted signal acquisition. In addition, or alternatively, the thermal manager may limit the number of thermal processes in anticipation of an attempted signal acquisition. For example, a threshold number of thermal processes, or a threshold combined thermal score for scheduled or executing processes, may be permitted, and processes exceeding the threshold can be cancelled or delayed.

Thermal management to improve thermal stability can include scheduling processes based on their thermal score. The thermal score for currently executing processes, or a current temperature, can be measured when signal acquisition is initiated or scheduled, and the thermal manager can determine the thermal score for queued processes. The thermal manager can cancel, delay, or move up the execution of queued thermal processes so that the measured thermal score, or the measured temperature, is maintained for the duration of signal acquisition. In addition, the thermal manager may schedule the execution of dummy processes to maintain a thermal score or temperature during signal acquisition, e.g., if the device already has an elevated temperature. Maintaining an elevated temperate can be preferable to a decrease as a stable temperature can be better than a decrease in temperature. A thermal dummy process can be a process that is executed solely to increase temperature, and the output of a thermal dummy process is not used by the device, e.g., stored or used in conjunction with another process (e.g., a series of calculations that are discarded).

While examples of thermal management for signal acquisition are described, the thermal management techniques described herein can be performed with any process that requires precise timing. For example, time sensitive processes can include time-of-flight localization techniques, cellular communication techniques, time transfer between devices, peer-to-peer communication, audio/video time synchronization, or communication protocols such as Bluetooth.

I. Global Navigation Satellite System

FIG. 1 is a schematic diagram of a communication system 10 having user equipment 12 communicatively coupled to a cellular network 14 (e.g., a third generation (3G) cellular network, a fourth generation (4G) or Long Term Evolution (LTE) cellular network, a fifth generation (5G) or New Radio (NR) cellular network, a beyond 5G cellular network, or the like) via a cellular base station 16 (e.g., a NodeB, an eNodeB, a gNodeB, or the like), and communicatively coupled to a GNSS network 18 via one or more GNSS satellites 20, accordingly to embodiments of the present disclosure. The cellular network 14 may be implemented and/or supported by multiple such base stations 16, radio access networks, core networks, and so on. Similarly, the GNSS network 18 may be implemented and/or supported by multiple such GNSS satellites 20, ground stations, and so on. Although certain embodiments are described herein with respect to processing a GNSS signal from one or more GNSS satellites 20, it should be understood that in other embodiments, the user equipment 12 may be communicatively coupled to a GPS network in addition to, or instead of, the GNSS network 18 via one or more GPS satellites and process a GPS signal from the GPS satellites in accordance with embodiments described herein.

The user equipment 12 may receive signals from the GNSS satellites 20 and process the signals to determine a global position of the user equipment 12. In particular, each GNSS satellite 20 may transmit one or more pilot channels alongside a data signal. Each pilot channel is a dataless signal transmitted from a corresponding GNSS satellite 20. The user equipment 12 may process one or more of the pilot channels from one or more GNSS satellites 20 to determine the position of the user equipment 12. In certain embodiments, the user equipment 12 may generate and maintain respective tracking loops for each pilot channel received from the GNSS satellites 20. For instance, the user equipment 12 may receive a single pilot channel from a GNSS satellite 20, two pilot channels from a GNSS satellite 20, three pilot channels from a GNSS satellite 20, four pilot channels from a GNSS satellite 20, five pilot channels or more from a GNSS satellite 20, and so on. Additionally, the user equipment 12 may receive pilot channels from more than one GNSS satellite 20 (e.g., up to thirty-five or more satellites).

Figure 2:
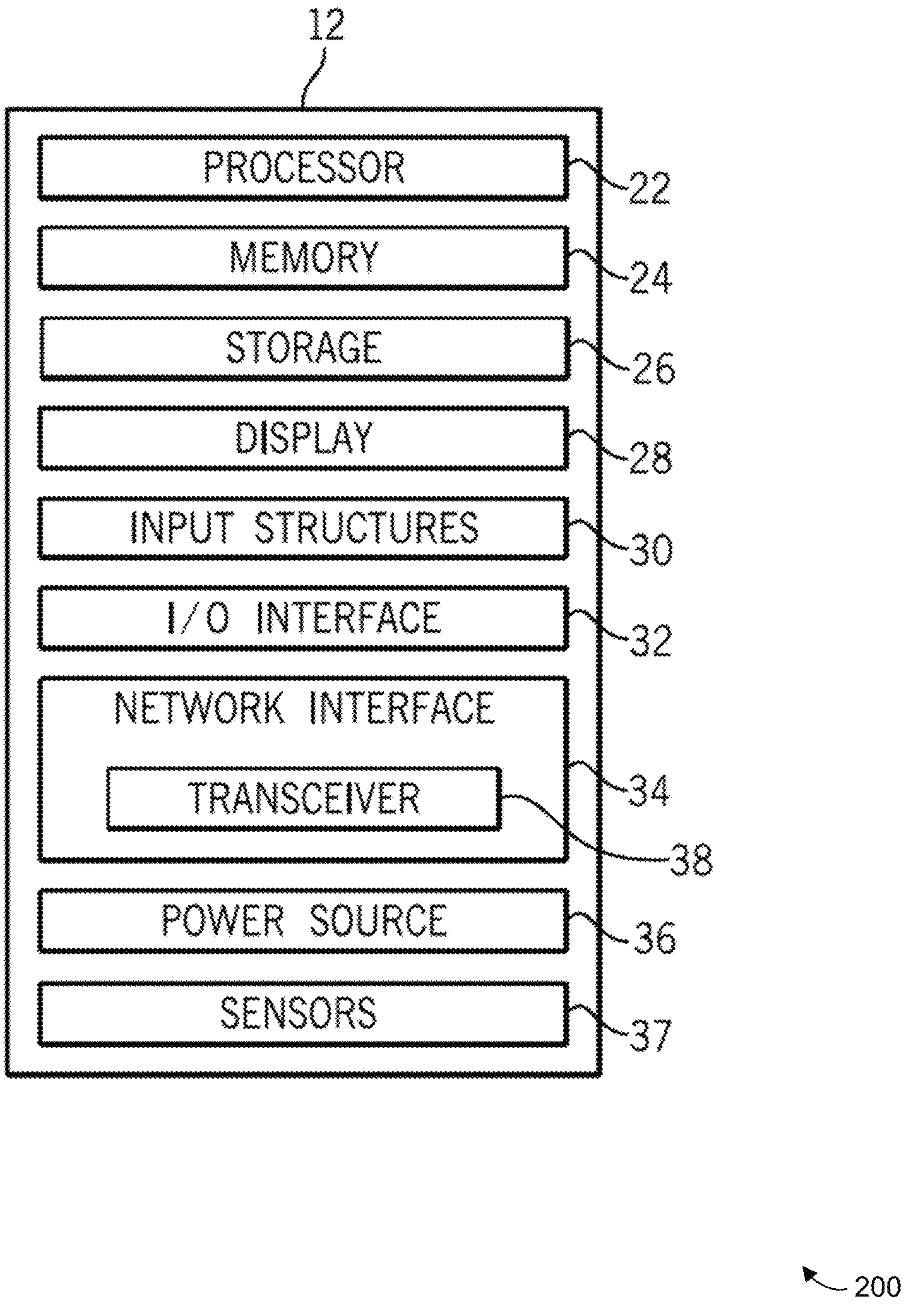
FIG. 2 is a block diagram of the user equipment according to various embodiments.

FIG. 2 is a block diagram of the user equipment 12 (e.g., an electronic device) of FIG. 1, according to embodiments of the present disclosure. The user equipment 12 may include, among other things, one or more processors 22 (collectively referred to herein as a single processor for convenience, which may be implemented in any suitable form of processing circuitry), memory 24, nonvolatile storage 26, a display 28, input structures 30, an Input/Output (I/O) interface 32, a network interface 34, a power source 36, and one or more sensors 37. The various functional blocks shown in FIG. 2 may include hardware elements (including circuitry), software elements (including machine-executable instructions) or a combination of both hardware and software elements (which may be referred to as logic). The processor 22, the memory 24, the nonvolatile storage 26, the display 28, the input structures 30, the I/O interface 32, the network interface 34, the power source 36, and/or the sensors 37 may each be communicatively coupled directly or indirectly (e.g., through or via another component, a communication bus, a network) to one another to transmit and/or receive data between one another. It should be noted that FIG. 2 is merely one example of a particular implementation and is intended to illustrate the types of components that may be present in the user equipment 12.

By way of example, the user equipment 12 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple, Inc. of Cupertino, California), a wearable electronic device (e.g., in the form of an Apple Watch® by Apple Inc. of Cupertino, California), and other similar devices. It should be noted that the processor 22 and other related items in FIG. 2 may be generally referred to herein as "data processing circuitry." Such data processing circuitry may be embodied wholly or in part as software, hardware, or both. Furthermore, the processor 22 and other related items in FIG. 2 may be a single contained processing module or may be incorporated wholly or partially within any of the other elements within the user equipment 12. The processor 22 may be implemented with any combination of general purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processor 22 may include one or more application processors, one or more baseband processors, or both, and perform the various functions described herein.

In the user equipment 12 of FIG. 2, the processor 22 may be operably coupled with a memory 24 and a nonvolatile storage 26 to perform various algorithms. Such programs or instructions executed by the processor 22 may be stored in any suitable article of manufacture that includes one or more tangible, computer-readable media. The tangible, computer-readable media may include the memory 24 and/or the nonvolatile storage 26, individually or collectively, to store the instructions or routines. The memory 24 and the nonvolatile storage 26 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 22 to enable the user equipment 12 to provide various functionalities.

In certain embodiments, the display 28 may facilitate users to view images generated on the user equipment 12. In some embodiments, the display 28 may include a touch screen, which may facilitate user interaction with a user interface of the user equipment 12. Furthermore, it should be appreciated that, in some embodiments, the display 28 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 30 of the user equipment 12 may enable a user to interact with the user equipment 12 (e.g., pressing a button to increase or decrease a volume level). The I/O interface 32 may enable user equipment 12 to interface with various other electronic devices, as may the network interface 34. In some embodiments, the I/O interface 32 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 34 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a third generation (3G) cellular network, a universal mobile telecommunication system (UMTS), a fourth generation (4G) cellular network, a long term evolution (LTE®) cellular network, a long term evolution licenses assisted access (LTELAA) cellular network, a fifth generation (5G) cellular network, New Radio (NR) cellular network, a cellular network beyond 5G, a satellite network, and so on. In particular, the network interface 34 may include, for example, one or more interfaces for using a Release-15 cellular communication standard of the 5G specifications that include the millimeter (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 34 of the user equipment 12 may allow communication over the aforementioned networks (e.g., 5G, Wi-Fi, LTE-LAA, and so forth).

The network interface 34 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 34 includes a cellular transceiver 38. In some embodiments, all or portions of the cellular transceiver 38 may be disposed within the processor 22. The cellular transceiver 38 may support transmission and receipt of various wireless signals via one or more antennas, and thus may include a transmitter and a receiver. The power source 36 of the user equipment 12 may include any suitable source of power, such as a rechargeable lithium polymer (Li-poly) battery and/or an alternating (AC) power converter.

The sensors 37 of the user equipment 12 may include one or more motion sensors, one or more temperature sensors, one or more light sensors, one or more pressure sensors, one or more cameras or image sensors, or any other suitable sensors. In certain embodiments, the motion sensors may include an inertial measurement unit (IMU), a threedimensional accelerometer, a three-dimensional gyroscope, or the like, that may detect a motion of the user equipment 12. For example, the IMU may detect a rotation of the user equipment 12, a rotational movement of the user equipment 12, an angular displacement of the user equipment 12, a tilt of the user equipment 12, an orientation of the user equipment 12, a linear motion of the user equipment 12, a non-linear motion of the user equipment 12, or the like. The temperature sensors may include a temperature sensor that may measure a temperature of an oscillator of a GNSS receiver of the user equipment 12, an internal temperature of the user equipment 12, a circuit junction temperature of the user equipment 12, an external temperature of the user equipment 12, or the like. Temperature measurements from the temperature sensors can be provided as input to a thermal arbiter executing on processor 22. The light sensors may detect a quantity of ambient light external to the user equipment 12. The pressure sensors may include, for example, a barometer, that may detect an atmospheric pressure associated with the user equipment 12. The sensors 37 may additionally or alternatively include one or more cameras, such as onboard cameras for visual inertial odometry and/or other suitable position/location sensing techniques.

Figure 3:
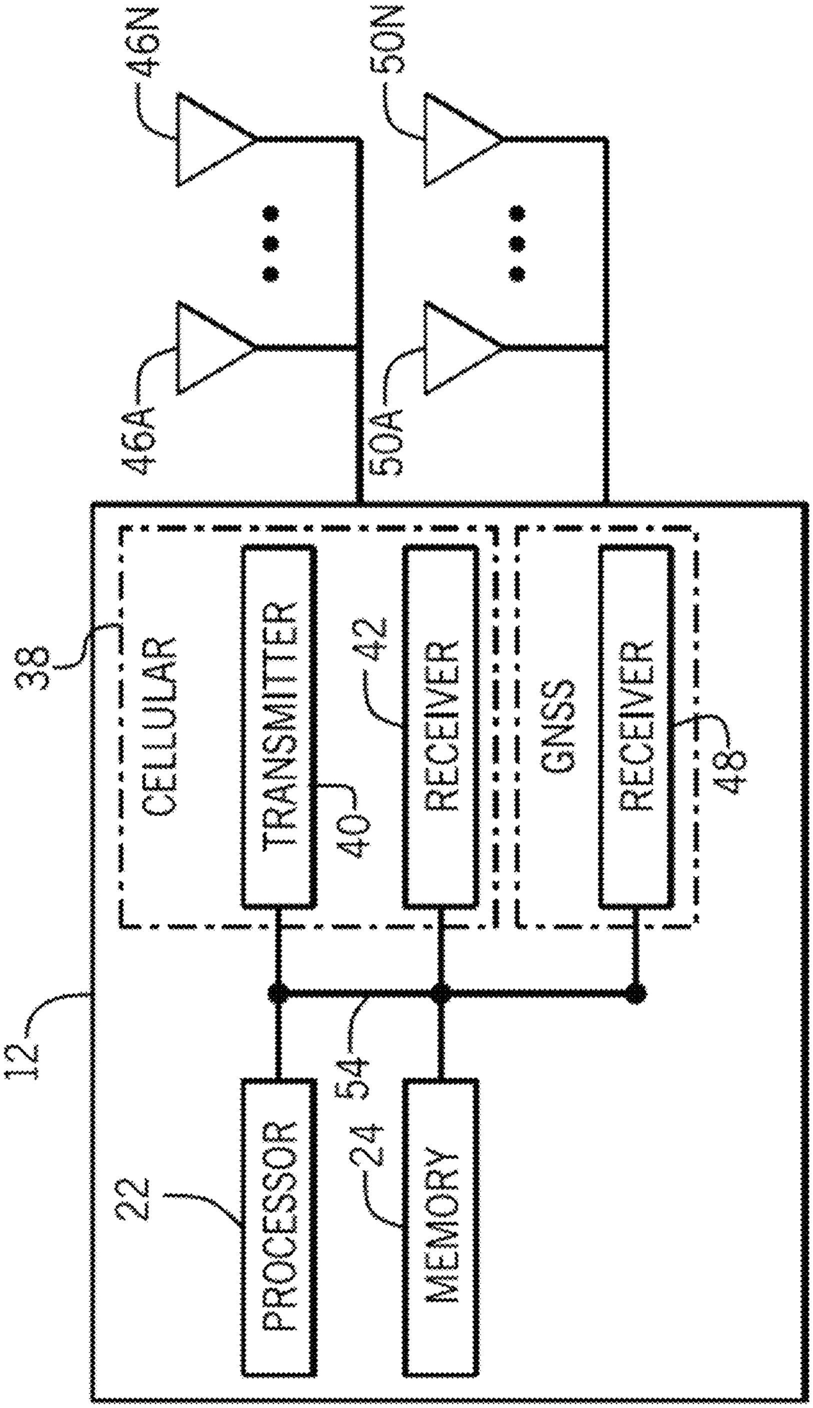
FIG. 3 is a functional diagram of the user equipment according to various embodiments.

FIG. 3 is a functional diagram of the user equipment 12 of FIGS. 1 and 2, according to embodiments of the present disclosure. As illustrated, the processor 22, the memory 24, the cellular transceiver 38, a cellular transmitter 40, a cellular receiver 42, antennas 46 (illustrated as 46A-46N, collectively referred to as an antenna 46), and/or a GNSS receiver 48 may be communicatively coupled directly or indirectly (e.g., through or via another component, a communication bus, a network) to one another to transmit and/or receive data between one another.

In particular, the cellular transceiver 38 may be in the form of a cellular transceiver 38 having a cellular transmitter 40 and/or a cellular receiver 42 that respectively enable transmission and reception of cellular signals between the user equipment 12 and an external device via, for example, a cellular network (e.g., including base stations, such as NodeBs, eNBs or eNodeBs (Evolved NodeBs or E-UTRAN (Evolved Universal Mobile Telecommunication System (UMTS) Terrestrial Radio Access Network) NodeBs, or gNBs or gNodeBs (e.g., Next Generation NodeB)). As illustrated, the cellular transmitter 40 and the cellular receiver 42 may be combined into the cellular transceiver 38.

Additionally, the user equipment 12 may also include the GNSS receiver 48 that may enable the user equipment 12 to receive GNSS signals from a GNSS network (e.g., GNSS network 18 of FIG. 1), including one or more GNSS satellites (e.g., GNSS satellites 20 of FIG. 1) or GNSS ground stations. The GNSS signals may include a GNSS satellite's observation data, broadcast orbit information of tracked GNSS satellites, and supporting data, such as meteorological parameters, collected from co-located instruments of a GNSS satellite. For example, the GNSS signals may be received from a Global Positions System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on.

As described above, the GNSS receiver 48 may receive GNSS signals from the GNSS satellites 20 and process the signals to determine a global position of the user equipment 12. In particular, each GNSS satellite 20 may transmit one or more pilot channels alongside a data signal. Each pilot channel is a dataless signal transmitted from a corresponding GNSS satellite 20. The user equipment 12 may process one or more of the pilot channels from one or more GNSS satellites 20 to determine the position of the user equipment 12.

The GNSS receiver 48 may process the received pilot channels of the GNSS signals from each GNSS satellite 20 to amplify the power of the pilot channels, generate and maintain tracking loops for each pilot channel, and determine the position of the user equipment 12 based on each pilot channel. For instance, the GNSS receiver 48 may amplify the power of the pilot channels and generate the tracking loop for each pilot channel by performing a series of signal processing operations based on the received pilot channel. The GNSS receiver 48 may then perform a radio frequency (RF) down-conversion operation, a sampling operation, a Doppler removal operation, a coherent signal integration operation, and a non-coherent summation operation based on the received pilot channel. However, in certain embodiments, it should be understood that the GNSS receiver 48 may perform the signal processing operations in different sequences than the sequence described, and certain operations may be skipped or not performed altogether.

The GNSS receiver 48 may include a frequency stability prediction engine, which may be implemented as hardware (e.g., circuitry), software (e.g., instructions stored in the memory 24 and/or the nonvolatile storage 26), or both (e.g., as logic). As mentioned above, during the coherent signal integration operation performed by the GNSS receiver 48 against a pilot channel of a received GNSS signal, the GNSS receiver 48 integrates the pilot channel over a coherent period of time to generate a resulting signal with a particular signal to noise ratio (SNR). Thereafter, during the non-coherent summation operation, the resulting signal is squared to increase the signal gain. Generally, a higher SNR in the resulting signal generated from the coherent signal integration operation will minimize a squaring loss that is incurred in the resulting signal from squaring the noise present in the resulting signal during the noncoherent summation operation. As such, by minimizing the squaring loss in the resulting signal from the non-coherent summation operation, the quality of the signal is increased, thereby increasing an accuracy in determining the position of the user equipment.

However, a number of factors may affect the signal during the coherent signal integration operation, which can decrease the SNR in the resulting signal. For instance, such factors may affect oscillator dynamics of the user equipment 12, such as motion experienced by a reference oscillator of the GNSS receiver 48 or thermal changes experienced by the reference oscillator of the GNSS receiver 48, and user dynamics associated with the user equipment 12, such as motion of the user equipment 12, thermal changes associated with the user equipment 12, and the like. Accordingly, the frequency stability prediction engine of the GNSS receiver 48 may dynamically adjust the coherent period of time for performing the coherent signal integration operation against the pilot channel of the GNSS signal based on various types of data associated with the user equipment 12. For instance, the frequency stability prediction engine of the GNSS receiver 48 may receive data from one or more sensors 37 associated with the user equipment 12 that are indicative of current and/or expected conditions associated with the user equipment 12 (e.g., motion, temperature, light, pressure, and so on). In certain embodiments, the data may be indicative of a temperature associated with the reference oscillator of the GNSS receiver 48, the user equipment, or both; an expected change in temperature associated with the reference oscillator of the GNSS receiver 48, the user equipment, or both; a motion associated with the reference oscillator of the GNSS receiver 48, the user equipment, or both; an expected change in motion associated with the reference oscillator of the GNSS receiver 48, the user equipment, or both; or the like.

In some embodiments, the user equipment 12 may determine a current motion associated with the user equipment 12 or an expected motion associated with the user equipment 12 based on data from the sensors 37. For instance, the user equipment 12 may determine an orientation, a position, or both, of the user equipment 12 with respect to a user of the user equipment 12. The user equipment 12 may determine that the orientation or the position of the user equipment 12 is indicative of a stationary orientation or position of the user equipment 12, a changing orientation or position of the user equipment 12, or the like. For instance, the user equipment 12 may determine that the user is holding the user equipment 12 in a hand of the user, the user is walking with the user equipment 12 in a hand of the user, the user is jogging with the user equipment 12 in a hand of the user, the user is running with the user equipment 12 in a hand of the user, the user is carrying the user equipment 12 in a pocket of the user, the user is walking with the user equipment 12 in a pocket of the user, the user is jogging with the user equipment 12 in a pocket of the user, the user is running with the user equipment 12 in a pocket of the user, the user is driving a vehicle with the user equipment 12 in the vehicle, and the like. The frequency stability prediction engine of the GNSS receiver 48 may receive data indicative of the orientation or the position of the user equipment 12 from the user equipment 12 (e.g., the processor 22, the memory 24, the nonvolatile storage 26).

The frequency stability prediction engine of the GNSS receiver 48 may also receive other suitable types of data or information from the user equipment 12 that are indicative of factors that may affect the pilot channel of the GNSS signal during the coherent signal integration operation. For instance, the frequency stability prediction engine of the GNSS receiver 48 may receive data indicative of an upcoming transmission from an antenna associated with the user equipment 12, data indicative of a powering down of an antenna associated with the user equipment 12, data indicative of a powering on of a cellular power amplifier associated with the user equipment 12, data indicative of a powering down of a cellular power amplifier associated with the user equipment 12, or the like. The frequency stability prediction engine may receive information indicating the current or predicted oscillator temperature from the thermal manager (e.g., thermal manager 545).

After receiving data associated with the user equipment 12 that may be indicative of one or more factors that may affect the pilot channel of the GNSS signal during the coherent signal integration operation, the frequency stability prediction engine of the GNSS receiver 48 may determine a corresponding period of time (e.g., a coherent period of time) for performing the coherent signal integration operation (e.g., coherent operation) against the pilot channel of the GNSS signal. In certain embodiments, the frequency stability predication engine of the GNSS receiver 48 may compare the data received from the user equipment 12 predefined values of the coherent period of time (e.g., stored in a look-up table in the memory 24 or the nonvolatile storage 26). For instance, the different values for the coherent period of time may be associated with one or more data inputs indicative of the respective factors that may affect the pilot channel of the GNSS signal during the coherent signal integration operation. In some embodiments, the values of the coherent period may be pre-determined by a manufacturer of the user equipment 12. In other embodiments, the user equipment 12 may receive one or more updates to the values over time to update the values of the coherent period that correspond to the data inputs indicative of the respective factors that may affect the pilot channel of the GNSS signal during the coherent signal integration operation.

After the frequency stability prediction engine of the GNSS receiver 48 determines a corresponding coherent period of time for performing the coherent signal integration operation against the pilot channel of the GNSS signal, the GNSS receiver 48 may perform the coherent signal integration against the pilot channel of the GNSS signal using the determined coherent period of time. By adjusting the coherent period of time for performing the coherent signal integration operation to account for current and/or expected conditions associated with the user equipment 12, a higher SNR of the resulting signal may be obtained. In this way, the squaring loss that is incurred in the resulting signal from squaring any noise present in the resulting signal during the subsequent non-coherent summation operation may be decreased or minimized, thereby increasing the quality of the signal for determining the position of the user equipment 12.

The user equipment 12 may also have one or more antennas 46A-46N (collectively 46) electrically coupled to the cellular transceiver 38, and one or more antennas 50A-50N (collectively 50) electrically coupled to the GNSS receiver 48. The antennas 46, 50 may be configured in an omnidirectional or directional configuration, in a single-beam, dualbeam, or multi-beam arrangement, and so on. Each antenna 46, 50 may be associated with one or more beams and various configurations. In some embodiments, multiple antennas of the antennas 46, 50 of an antenna group or module may be communicatively coupled to a respective transceiver 38 or the GNSS receiver 48 and each emit radio frequency signals that may constructively and/or destructively combine to form a beam. The user equipment 12 may include multiple transmitters, multiple receivers, multiple transceivers, and/or multiple antennas as suitable for various communication standards.

As illustrated, the various components of the user equipment 12 may be coupled together by a bus system 54. The bus system 54 may include a data bus, for example, as well as a power bus, a control signal bus, and a status signal bus, in addition to the data bus. The components of the user equipment 12 may be coupled together or accept or provide inputs to each other using some other mechanism.

II. GNSS Signal Types

Navigation with a global navigation satellite system (GNSS) can begin with an acquisition mode (e.g., acquisition state). During this acquisition mode, the GNSS satellite signals are detected, subsequently tracked, and ranging measurements are determined by an electronic device using tracked satellite signals. These ranging measurements can include time-of-flight estimates for signals sent from the satellite to the mobile device. Once a sufficient number of measurements from independently tracked satellite signals are available, a position can be determined, and a tracking mode (e.g., tracking state) can begin.

In the acquisition mode, the receiver uses signal processing resources in order to detect the first GNSS satellite. Once the satellite has been detected and a position is determined, the mobile device can transition to a configuration for the tracking mode. Once a first satellite has been detected, the search uncertainty for detection of additional satellites is significantly reduced, and fewer signal processing resources are needed. If a device in the tracking position loses the position (e.g., the uncertainty about the location is above a threshold), the device can return to the acquisition mode from the tracking mode. Thermal stability may be more important during signal acquisition, and the thermal manager may attempt to stabilize the temperature to prepare for signal acquisition.

Different signal types can be used for each of the acquisition mode and the tracking mode. The Global Positioning System (GPS), a type of GNSS, can use either a L1 signal or a L5 signal for both acquisition and tracking. However, there are advantages to using the L1 signal for acquisition because the L1 signal can be processed more quickly than the L5 signal. While the L1 signal may be desirable for acquisition, the L5 signal is more powerful and can allow for more precise tracking. Accordingly, using the L5 signal, or a combination of the L1 and L5 signal may be desirable for tracking in some circumstances.

L1 signals are signals satellite navigation signals that are broadcast at 1575.42 megahertz (MHz). These signals have a lower chipping rate than the L5 signals, and L1 signals can be processed more rapidly. The lower chipping rate (e.g., approximately $1/10^{th}$ of the L5 chipping rate) means that there are fewer samples for the mobile device to store and process for a L1 signal when compared to a L5 signal. Accordingly, L1 signals can be processed considerably faster than a L5 signal. Because of the difference in chipping rates, processing a L1 signal may involve processing five to ten times fewer samples than processing a L5 signal. In addition, L1 signals have shorter primary codes than L5 signals which means that analyzing L1 signals is less complex than analyzing L5 signals.

L5 signals may be advantageous in some circumstances. The L5 signal, which is a satellite navigation signal broadcast at 1176 MHz, is has a higher power than L1 signals. Accordingly, the L5 signal can have similar detection performance with a lower integration time when compared to the L1 signal. In addition, the L5 signal has a secondary code, which can complicate acquisition, but can simplify data synchronization. The simplified data synchronization can simplify the transition from acquisition to tracking. In addition, the complexity of the L5 signal means that the L5 signal can provide more precise location tracking than the L1 signal. For example, the uncertainty for ranging measurements with L5 signals can be on the order of ten times lower than for ranging with L1 signals. Accordingly, there may be benefits to using the L1 signal for acquisition and the L5 signal for tracking. Further details about L1 and L5 signals can be found in: Leclère J, Landry R Jr, Botteron C. Comparison of L1 and L5 Bands GNSS Signals Acquisition. Sensors (Basel). 2018 Aug. 23; 18 (9): 2779. Doi: 10.3390/s18092779. PMID: 30142964; PMCID: PMC6165328.

During acquisition, a GNSS enabled device can use a cross ambiguity function (CAF) to identify the presence of a satellite signal in a received signal. Each GNSS satellite can be assigned a particular code (e.g., a spread spectrum code) so that multiple satellite signals can be detected from a received signal. The code is used to modulate a carrier signal, transmitted by the satellite, which carries the code information from the satellite to receivers. To identify a code, and the presence of a particular satellite, the received signal is multiplied by the carrier signal and a locally generated code. This result is integrated within a coherent integration time (e.g., a fixed time period), and the integrated result indicates the degree of similarity between the code of the received signal and the local code. The presence of a satellite can be determined if the similarity is above a threshold. More detailed discussion of the cross-ambiguity function and signal acquisition can be found at Foucras, Myriam & Leclère, Jérôme & Botteron, Cyril & Julien, Olivier & Macabiau, Christophe & Farine, Pierre-André & Ekambi, Bertrand. (2017). Study on the cross-correlation of GNSS signals and typical approximations. GPS Solutions. 21. 293-306. 10.1007/s10291-016-0556-7.

Figure 4:
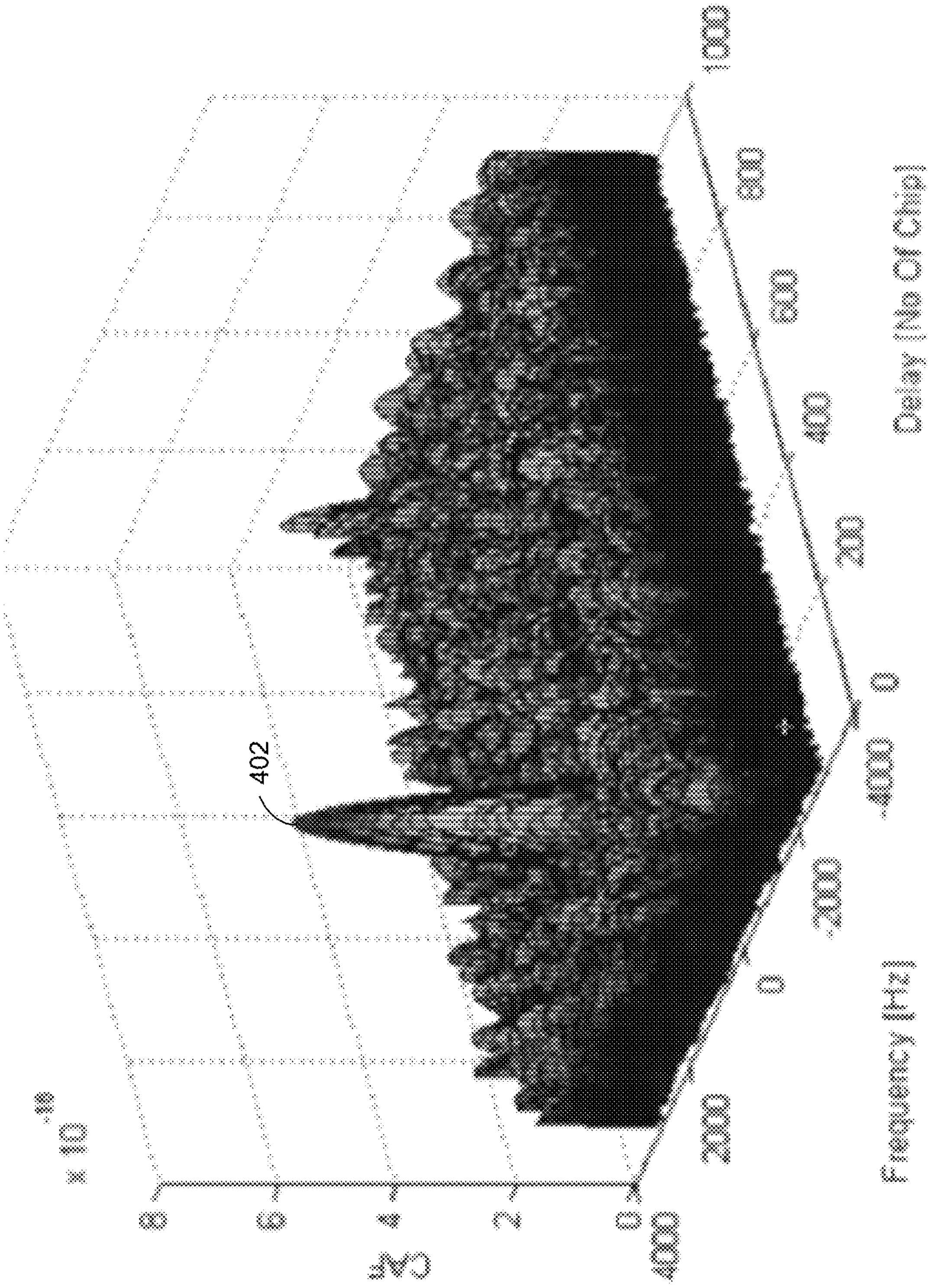
FIG. 4 is a graph showing the correlation between a received signal and local signals during GNSS signal acquisition according to various embodiments.

FIG. 4 is a graph 400 showing the output of a cross ambiguity function (CAF) during GNSS signal acquisition according to various embodiments. Multiple copies of the local code, with varying doppler frequencies and delays, can be compared to the received signal. In graph 400, the x-axis can be the doppler frequency in hertz (Hz), the y-axis can be the delay in seconds, and the z-axis can be the output of a cross-ambiguity function. The output from the cross-ambiguity function can be used to identify the presence of known GNSS signals in a received signal during the acquisition stage.

Signal acquisition involves determining whether particular GNSS signals are present in a received signal. To identify the particular signals, different local copies of known GNSS codes, modulated by a local carrier signal, are compared to the received signals using the cross-ambiguity function. These modulated codes can be referred to as local signals. The local signals can include multiple iterations of the known GNSS codes at different doppler frequency offsets and time offsets. A doppler frequency offset can be a difference in the frequency of successive local signals, and a time offset can be a difference in the time delay of successive local signals. A peak 402 in the cross-ambiguity function output can indicate that the received signal includes a GNSS signal corresponding to that particular local signal. The peak 402 can be the global maximum, a local maximum, or a cross-ambiguity function output with a magnitude that is above a threshold.

The similarity of the received signal and the local codes/carrier signals is represented by the amplitude of the cross-ambiguity function. This amplitude increases over the coherent integration time as a larger proportion of the signals are input to the cross-ambiguity function. The use of doppler frequency and time delay in the acquisition stage can make this stage vulnerable to thermal oscillator instability because locally generated code/carrier signal and the received signal may have to align both in time and frequency for at least part of the coherent integration time. Changes in the GNSS enabled device's oscillator frequency can mean that the alignment of the local codes/carrier signals and the received signal are unstable, and a cross ambiguity function peak cannot form (e.g., the received code is compared to multiple local codes during the coherent integration time so that the aggregate similarity, e.g., CAF amplitude, is low).

III. Device Architecture For GNSS Navigation

Thermal management can include stabilizing an oscillator's temperature during GNSS signal acquisition. The oscillator can efficiently perform signal acquisition at elevated temperatures as long as the rate of change in temperature (e.g., temperature fluctuations) are minimized. A thermal manager can identify thermal antagonists (e.g., thermal processes; processes that cause a change in the temperature during execution) and control their execution to stabilize the oscillator's temperature.

A. Architecture for GNSS Signal Acquisition

A mobile device may alter antennas' tuning states during GNSS tracking or in response to an event. The mobile device's antennas can be optimized for different signal types based on the tuning states. Changing the tuning states can allow the mobile device to perform tasks such as signal acquisition or tracking. In addition, changes to the tuning states can allow the mobile device to mitigate the effects of various events such as the device entering a thermal state.

Figure 5:
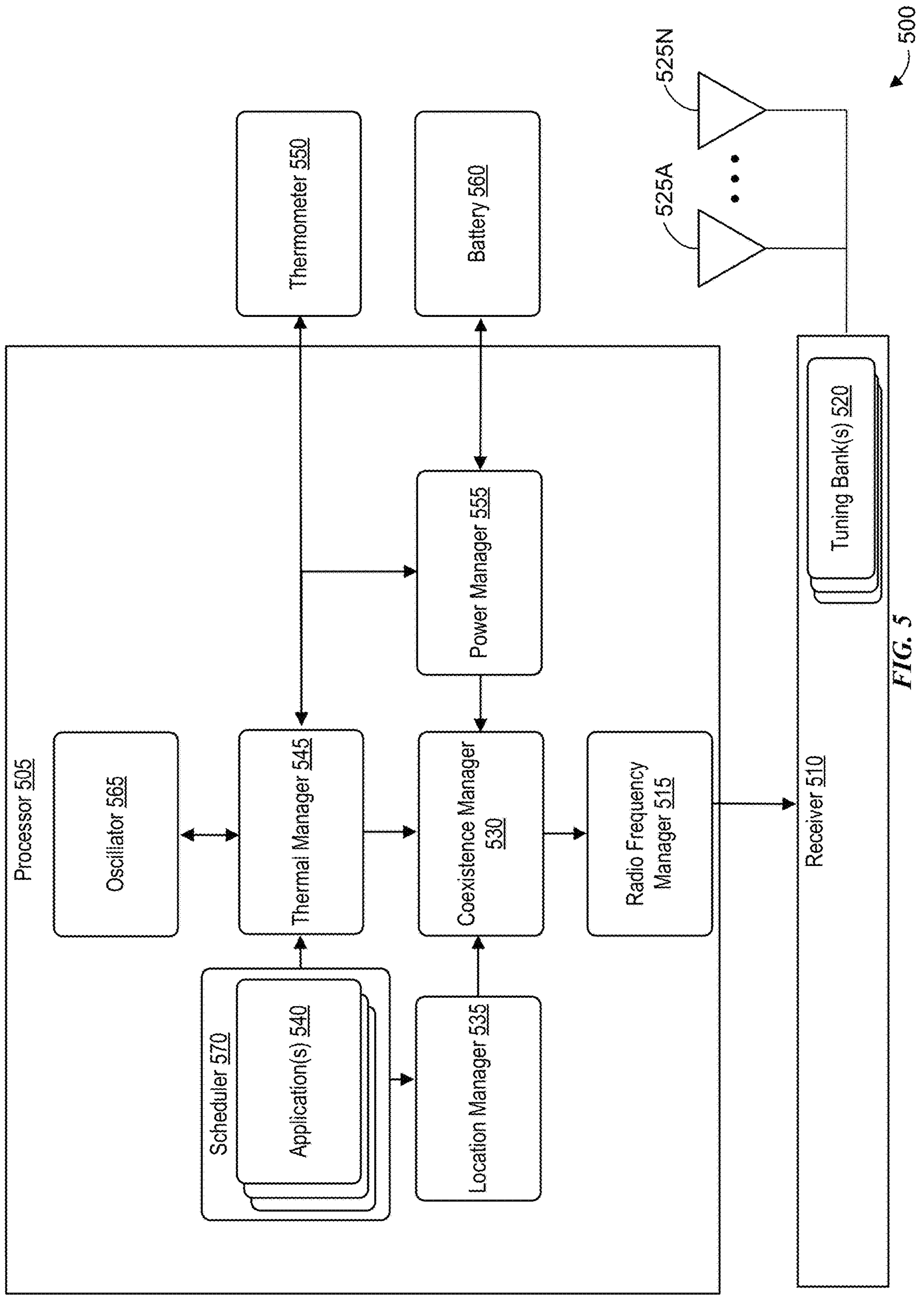
FIG. 5 is a simplified diagram of an architecture for GNSS signal acquisition according to various embodiments.

FIG. 5 is a simplified diagram of an architecture for GNSS navigation according to various embodiments. Processes executing on processor 505 can implement tuning logic and instruct receiver 510 to change the tuning state for one or more antennas. Processor can be part of a mobile device such as user equipment 12. In addition, receiver 510 can be similar to receiver 58 and processor 505 can be similar to processor 22 described above. Instructions to the receiver 510 can be sent by a radio frequency manager 515 and the receiver can connect or disconnect one or more of the tuning bank(s) 520 to the antennas 525*a*-525*n* in response to the instructions. Changing the tuning bank(s) 520 can change the tuning state for the antennas 525*a*-525*n*.

The tuning logic can be implemented by the coexistence manager 530 which can integrate information from the other processes executing on processor 505 to make decisions about changing the tuning state. Upon determining that the tuning state should change, the coexistence manager 530 can instruct the radio frequency manger to change the tuning state for antennas 525*a*-525*n*. The tuning logic can include changing the tuning state based on the GNSS mode (e.g., acquisition, or tracking), the thermal state (e.g., thermal event; whether temperature is stable or fluctuating), or the power state of the mobile device (e.g. the charge in the device's battery; whether the device is charging).

Location manager 535 can process signals received at the antennas and provide information about the current GNSS mode to the coexistence manager 530. Signals received at the antennas 525*a*-525*n* can be forwarded to the location manager 535 via the receiver 510, radio frequency manager 515, and coexistence manager 530. The location manager can interpret the signals and determine a location for the mobile device.

The location manager 535 can request location functionality from the coexistence manager 530. For instance, the location manager 535 can receive a request for location functionality from one or more application(s) 540. In response to the request, the location manager can request information about signals received at the antennas 525*a*-525*n* from the location manager 535. In response, the coexistence manager 530 can request that the radio frequency manager 515 acquire a connection with a satellite and perform tracking. The request from the coexistence manager 530 can include an instruction to change the tuning state or tracking mode depending on the current tracking mode.

B. Architecture for Identifying Thermal Processes

A mobile device may take corrective actions to change tuning state, or otherwise alter the device's behavior, in response to temperature fluctuations. For example, the mobile device may change the priority of scheduled processes or the tuning state for the device's antennas in response to a thermal state. The mobile device may identify thermal processes that cause temperature fluctuations before their execution so that the corrective actions can be taken to prepare for a thermal state.

Thermal manager 545 can detect or predict thermal states by identifying queued thermal processes. The frequency of oscillators in the mobile device can increase as the operating temperature of a device increases, and changes in temperature can increase the time to acquire a satellite's signal. A thermal state can be when the rate of change of operating temperature of a device is sufficiently high that the changed oscillator frequency, resulting from the temperature change, can cause errors. In addition, or alternatively, a thermal event may be when the temperature is elevated above a threshold.

The coexistence manager 530 can change the tuning state in response to a detected or predicted thermal event. For instance, some devices can struggle to process L5 signals during a thermal event. Accordingly, the coexistence manager 530 may instruct the radio frequency manager 515 to receive L1 signals instead of L5 signals in response to a thermal event detected by the thermal manager 545. In addition, the coexistence manager 530 can change the characteristics of the acquisition stage to optimize for the presence or absence of a thermal state. For example, the coexistence manager may cause the doppler frequency offsets or the time offsets to change in response to a thermal state. A smaller doppler frequency offset or a smaller time offset may be desirable when a mobile device is not in a thermal state.

Thermal manager 545 can predict thermal events by identifying thermal processes that are scheduled for execution in some embodiments. In some embodiments, the thermal manager 545 can use an instruction from application (s) 540 to prepare for a thermal state. For example, an application can inform the thermal manager 545 that GNSS location services are scheduled, and the thermal manager can begin to stabilize the device's temperature. In some embodiments, the application scheduling information can be provided to the thermal manager 545 by a scheduler 570.

The thermal manager 545 can use a machine learning model to identify thermal processes. The model can use temperature information and application information for the mobile device as input to a model for detecting or predicting a thermal process. A thermal process can be predicted if the probability of a temperature change during the process' execution, as determined by the model, is above a threshold. The features input to the model can include the current device temperature and a rate of change in the device temperature during the process' execution.

The thermal manager 545 can use additional sources of information to identify thermal processes. The information used to identify thermal processes can be provided to the machine learning model can be feature vectors (e.g., an ordered list of numeric properties). The features in a feature vector can include any combination of: the type of applications running (e.g., streaming, video game, social networking, video conference, etc.), calendar (e.g. showing upcoming tasks for user), the type of system tasks pending (ML model inferences, compute bound tasks, graphics bound tasks, input/output IO bound tasks, etc.), the cellular bands available to the mobile device, the availability of WiFi networks to the mobile device, Bluetooth connection status for the mobile device, display status for the mobile device (e.g., on/off), current thermal sensor readings for the mobile device, rate of change of thermal sensors of the mobile device, the mobile device's location (e.g., indoor/outdoor), the ambient temperature, the time of day, etc.

The thermal manager 545 can use one or more rules to identify thermal processes. For example, the thermal manager 545 can compare temperature information and application information against rules. The comparison can be used to identify whether a thermal event has occurred or to predict a thermal event. A device temperature, or the temperature's rate of change, can be compared against a threshold (e.g., a rule) to determine if a thermal state is likely to occur. In some embodiments, some processes may be known to cause thermal states based on past monitoring, a hardware manufacturer identifying the process as likely to cause a thermal state, or a software vendor identifying the process as likely to cause a thermal state. A rule can cause the thermal manager 545 to stabilize the temperature in response to such a process reaching a particular queue position.

The thermal manager 545 can control the execution of these thermal processes to maintain a stable device temperature (e.g., to perform thermal management). During thermal management, the thermal manager 545 can monitor the temperature of the mobile device using a thermometer 550 or by observing the frequency of oscillator 565. In some embodiments, the thermal manager 545 can monitor multiple thermometers at different locations in a mobile device. The thermal manager can monitor application(s) 540 to determine how to control the process' execution, and this monitoring can include one or more of which applications are being used, the priority of these applications, the number of scheduled processes for each application, the priority for each scheduled process, the thermal score for the processes, and the number of applications executing on the processor 505. Thermal scores are described below in more detail in section V.A.4.

C. Architecture for Monitoring Battery Charge

The charge in a mobile device's battery may be used to determine the device's tuning state and during thermal management. A device with low battery life (e.g., a battery charge that is below a threshold) may change tuning states, or delay thermal management, to conserve power. In some embodiments, thermal management may involve starting or stopping battery charging.

The power manager 555 can monitor the battery capacity of the battery 560. Processing some signal types may be more energy efficient than processing other signal types. For instance, processing L5 signals may be more energy demanding than processing L1 signals. Accordingly, the power manager 555 can monitor the battery 1060 to determine if the battery capacity is below the threshold (e.g., the device is in a low power state). The power manager 555 can notify the coexistence manager 530 that the device is in a low power state. Accordingly, the coexistence manager 530 may instruct the radio frequency manager 515 to receive L1 signals instead of L5 signals in response to the low power state.

The thermal manager 545 may use information about the capacity of battery 560 to determine if temperature stabilization is feasible. For example, the thermal manager 545 may begin to stabilize temperature if power manager 555 instructs the thermal manager 545 that the charge of battery 560 is above a threshold. In addition, thermal stabilization can include maintaining an elevated temperature through the execution of a dummy operation. If the thermal manager 545 receives information indicating that the charge of battery 560 is below a threshold, or if the rate of decrease of the charge of battery 560 is above a threshold, then the thermal manager 545 may determine that thermal stabilization is not feasible. In addition, a mobile device may experience elevated temperature during charging, and, accordingly, the thermal manager 545 may halt charging to stabilize the device's temperature.

D. Sequence for Performing Thermal Management

The thermal manager may implement thermal management by monitoring and controlling components in the mobile device. The coexistence manager and/or scheduler can provide the thermal manager with information about processes executing on the mobile device. The thermal manager can use these components to identify thermal processes that are scheduled for execution. During thermal stabilization, the thermal manager can control the execution of these processes to maintain a stable temperature.

Figure 6:
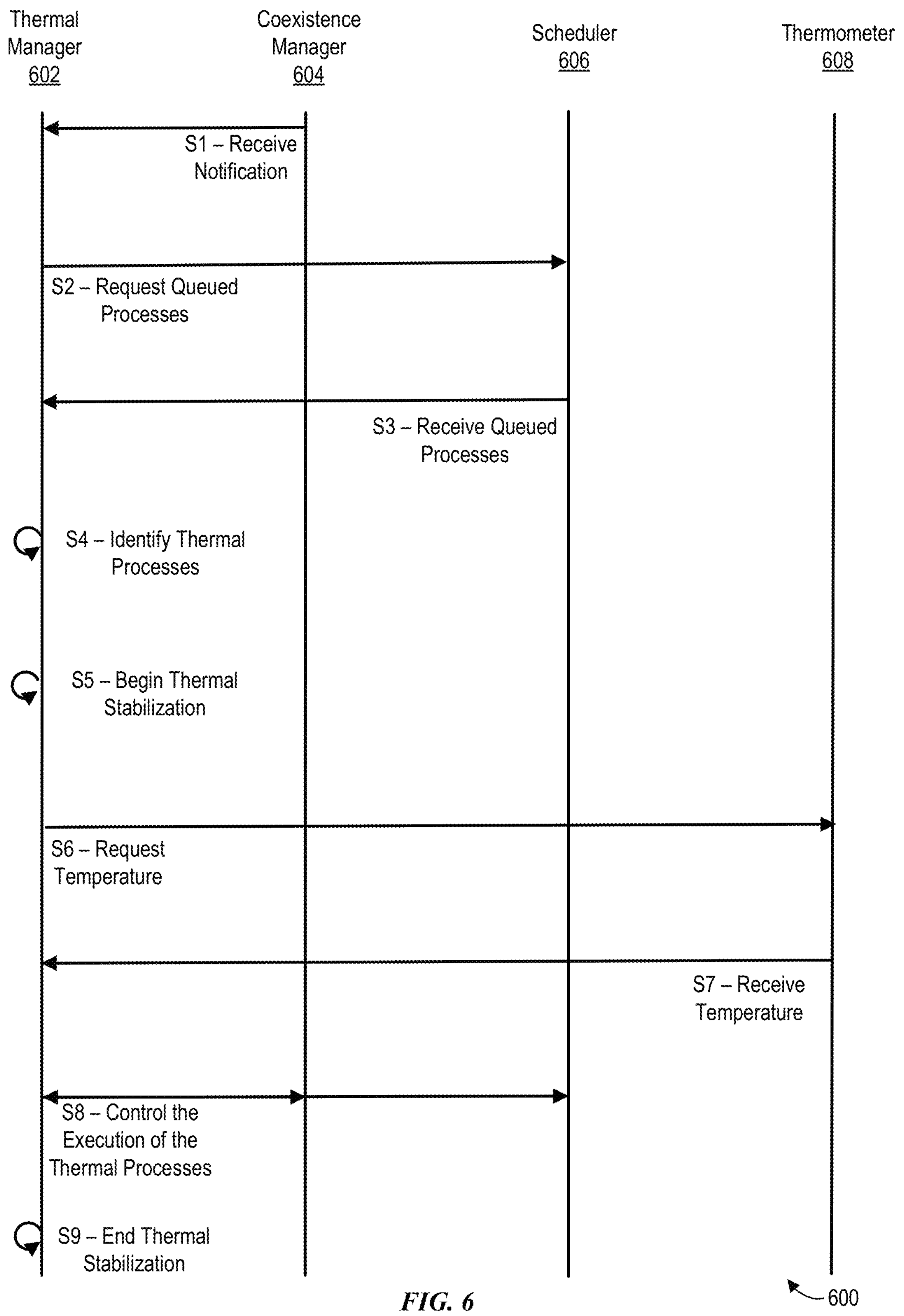
FIG. 6 is a sequence diagram showing thermal management according to various embodiments.

FIG. 6 is a sequence diagram 600 showing thermal management according to at least one embodiment.

At S1, the thermal manager 602 can receive a notification that an acquisition stage is scheduled. This notification can be provided by the coexistence manager 604. The notification may identify the process requesting location services. For instance, the coexistence manager 604 may receive a request for location services from a location manager. In response, the coexistence manager 604 can inform the thermal manager 602 that location services are anticipated. The notification can identify when the acquisition stage might occur. For example, the notification may include a queue position for the process or an estimated execution time for the process (e.g., an estimated time when the process might execute).

At S2, the thermal manager 602 may request the queued processes from the scheduler 606. The queued processes can be requested at regular intervals, and the request can identify the requested number of queued processes.

At S3, the queued processes can be received at the thermal manager 602 from the scheduler 606. The processes can be the processes that will execute in a particular time period, or a fixed number of processes from the queue (e.g., the five processes at the bottom of the queue).

At S4, the thermal manager can identify thermal processes in the queued processes received from the scheduler 606. In some embodiments, the thermal processes may have been flagged as thermal processes (e.g., by the software developer or phone manufacturer) and the thermal manager 602 can identify the thermal processes by searching a table (e.g., searching the table using identifiers for the received processes). The thermal managers may identify thermal processes by providing the received processes as input to a machine learning model or comparing the received processes to a set of rules. In some embodiments, the thermal manager 602 does not request the notification at S1, and the thermal manager can determine that an acquisition stage is scheduled using the queued process received from the scheduler 606.

At S5, thermal stabilization can begin. Thermal stabilization can involve maintaining the mobile device's temperature within a threshold. The thermal stabilization can begin in response to the identified thermal processes at S4 or thermal stabilization may begin in response to a notification from the coexistence manager 604 that a GNSS acquisition stage has begun. S6-S8 can be repeated until the thermal stabilization ends at S9, and these steps can be performed in any order during thermal stabilization (e.g., simultaneously, sequentially, etc.).

At S6, the thermal manager 602 can request a temperature from a thermometer 608. The thermometer may be one or more different thermometers located within the mobile device. In addition or alternatively, the thermal manager may request an oscillator frequency from an oscillator.

At S7, the temperature can be received at the thermal manager 602 from the thermometer 608. The temperature can be returned in response to the request at S6. For example, the request can specify a sampling rate for the temperature and the thermometer 608 can send temperature readings to the thermal manager 602 at the specified rate.

At S8, the thermal manager 602 can control the execution of the thermal processes. To control the execution, the thermal manager 602 can instruct the scheduler 606 or the coexistence manager 604 to extend the execution of a particular process for the duration of the thermal stabilization. In some embodiments, the thermal manager 602 may control the execution by changing the queue position for thermal processes. For example, a thermal process that is scheduled for execution may be delayed until the end of thermal stabilization.

At S9, the thermal manager 602 may end thermal stabilization. The thermal stabilization may end because the thermal manager 602 determines that the GNSS acquisition stage has ended. The thermal manager 602 monitors the execution state of queued processes during thermal management. The thermal manager 602 may use this monitoring to determine that the acquisition stage has ended. In addition or alternatively, the coexistence manager 604 may instruct the thermal manager that acquisition has ended.

E. GNSS Signal Receiver

The mobile device can change the tuning state depending on the desired signal type. For example, the antenna is connected to tuning banks that can be changed based on whether the mobile device is measuring L1 signals, L5 signals, or L1+L5 signals. The antenna can be tuned in response to a thermal state in some embodiments.

Figure 7:
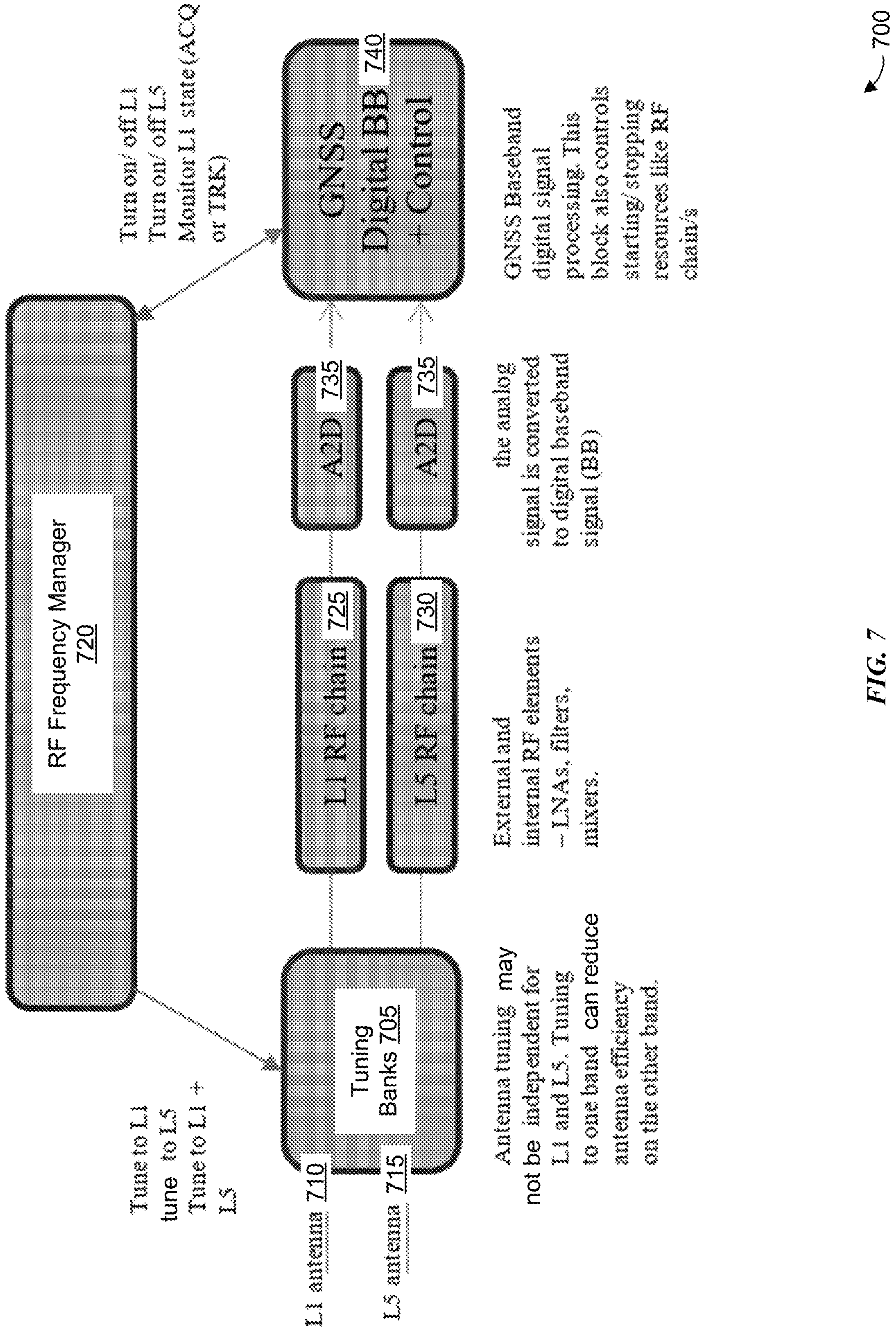
FIG. 7 shows a simplified diagram of a receiver according to various embodiments.

FIG. 7 shows a simplified diagram 700 of a receiver according to various embodiments. Components described with reference to FIG. 7 can be similar to related components described elsewhere in this disclosure. For example, the description for tuning bank(s) 520 can apply to tuning banks 705. Tuning banks 705 can comprise inductors and capacitors that can be connected to a L1 antenna 710 or a L5 antenna 715. Antenna tuning may not be independent for the L1 antenna 710 or the L5 antenna 715. For instance, tuning the L1 antenna 710 to improve the reception of L1 signals can reduce the efficiency of receiving L5 signals on the L5 antenna 715. Tuning of the antennas can be controlled by the RF frequency manager 720.

Different radio frequency (RF) chains can be configured to process different types of signals. For instance, a L1 RF chain 725 can be configured to process L1 signals received at the antennas, and a L5 radio frequency chain 730 can be configured to process L5 signals received at the antennas. The RF chains may be turned off when they are not in use in order to conserve power. For instance, If the tuning banks 705 has tuned the L1 antenna 710 to receive L1 signals but the L5 antenna 715 has not been tuned to receive L5 signals, the L1 RF chain 725 may be turned on while the L5 RF chain 730 may be turned off.

Turning off a particular RF chain can cause delays in switching between signal types because it can take 700 milliseconds to turn on and provision a RF chain. Accordingly, received a 700-millisecond delay in processing received signals can be added if the corresponding RF chain has been turned off. Therefore, it may be advantageous to keep both the L1 RF chain 725 and the L5 RF chain 730 powered on to improve responsiveness when switching between signal types. To conserve power, a mobile device may turn off RF chains that are not currently being used when the mobile device is in a low power state. In addition, both RF chains may be powered on if the tuning banks 705 are configured so that the L1 antenna 710 and the L5 antenna 715 can both receive signals (e.g., a L1+L5 configuration). The RF chains can include radio frequency elements such as low-noise amplifiers (LNAs), filters, and mixers for the received signals. A thermal manager (e.g., thermal manager 545) may control whether the RF chains are turned on or off in order to manage the temperature of the mobile device.

After signals have been processed by a RF chain, the signals can be converted from an analog signal to a digital signal by analog to digital (A2D) converters. The L1 or L5 signals are received at the antennas as analog signals and the analog to digital converters 735 can convert these into a digital baseband signal. Global navigation satellite system (GNSS) digital baseband (BB) control 740 can process the digital signals output from the analog to digital converters 735. In addition, the GNSS digital BB control 740 can control starting and stopping the L1 RF chain 725, the L5 RF chain 730, and the analog to digital converters 735. The GNSS digital BB control 740 can control starting and stopping the other components in response to instructions received from the RF frequency manager 720.

IV. Tuning GNSS Antennas

Antennas can be tuned to optimize signal acquisition and tracking for GNSS tracking and other location-based functionality. In addition, there may be other situations where changing the tuning state is advantageous. For example, different signal types may be more energy efficient, and the antenna may be tuned so that the mobile device can conserve power. Also, different signal types may be more resistant to interference from thermal events when the device's oscillator frequency changes due to increased operating temperatures.

A. GNSS Modes and Tuning

The antenna for a mobile device can be tuned in response to a user input to the device. For example, GNSS navigation can be initiated when a user interacts with an application that involves location-based functionality. A user may open a map application on a mobile device in order to use the application to navigate to a point of interest. When the user is not using location-based functionality, the mobile device may not track the device's location in order to conserve battery life and processing power. Accordingly, the mobile device may begin GNSS navigation, and thermal management, in response to the user's selection.

GNSS navigation can include at least two modes: a temperature sensitive acquisition mode and a tacking mode. Continuing the example from above, the acquisition mode can begin in response to the user's interaction with the map application. During the acquisition mode, the mobile device can establish a connection with a satellite and determine a position for the device. As discussed above, some signal types may allow the mobile device to more efficiently establish a connection with a satellite. In addition, different signal types may be more resistant to thermal states. In particular, the L1 signal can be useful in the acquisition mode because the L1 signal is less complex, and a device can process a L1 signal with fewer samples than would be required for a L5 signal.

During the acquisition mode, the mobile device can operate in an acquisition configuration. In this acquisition configuration, the mobile device's antennas can be tuned to receive L1 signals. The antennas can be tuned though impedance matching by connecting the antenna to one or more tuning banks. A tuning bank can be a circuit with inductors or capacitors that are configured to allow for the strongest received signal at a particular range of frequencies.

In some circumstances, the mobile device may not be able to establish a connection with the satellite using a particular signal type. For example, the L1 signal may not be sufficient to establish a connection in certain locations or in certain atmospheric conditions. In such circumstance, the mobile device may change the tuning state for the antenna without leaving the acquisition mode. For example, if a connection with a satellite cannot be established in a threshold amount of time using a L1 signal, the mobile device may tune the antenna for a combination of L1 and L5 signals. After the tuning state has been changed, the mobile device can attempt to establish a connection with the satellite using the signals in the changed frequency range. In addition, or alternatively, the mobile device may change signal types in response to a change in the thermal state of the mobile device. For example, a mobile device may begin acquisition using L1 signals because the device is in a thermal state. If the device's temperature is stabilized before the acquisition mode has concluded, the mobile device may change the signal type from an L1 signal to a L5 signal in some embodiments.

Once a connection with a satellite is established, the GNSS navigation can proceed to a tracking mode and the mobile device can enter a tracking mode. In the tracking mode, the mobile device may tune its antenna to receive a frequency range than was received in the acquisition mode.

For example, the mobile device may use L1 signals for acquisition and a combination of L1 and L5 signals, or just L5 signals, for tracking. The tracking mode may be more resistant to unstable temperatures and the mobile device may stop thermal management once the acquisition mode has concluded and the tracking mode has begun.

In some circumstances, a mobile device in tracking mode may need to reestablish a connection with a satellite. For instance, the mobile device may determine that the determined position for the mobile device is not reliable because the uncertainty of the location determined during tracking may be over a threshold or the GPS/GNSS time uncertainty has increased above a threshold. In such circumstances, the mobile device may return to an acquisition mode in order to reestablish a connection with a satellite. Returning to an acquisition mode can include changing the tuning state for the antenna by changing the tuning bank that is connected to the mobile device's antenna. In addition, the mobile device may stabilize the device's temperature in response to returning to the acquisition mode.

1. Tuning to Conserve Device Power

Different signal types may be more energy efficient than other signal types. For instance, processing a L1 signal may consume less energy than processing L5 signals. Accordingly, the mobile device may change to tuning states to conserve energy. A power manger can monitor the battery capacity (e.g., the amount of energy in the battery) and the power manager can identify low power states when the battery capacity is below a first threshold. In response to the low power state, the mobile device can switch from receiving L5 signals, or a combination of L1 and L5 signals, to receiving only L1 signals. The device can return to processing L5 signals, or a combination of L1 and L5 signals, if the mobile device's power capacity is above a second threshold. This second threshold can be higher than the first threshold. For instance the first threshold can be at 20% of battery life and the second threshold can be at 80% of battery life.

A device can determine that the device is in a low power mode and turn off frequency chains (e.g., RF frequency chain 730, RF frequency chain 735) to save power. For example, while transitioning from the acquisition mode to the tracking mode, the device can turn of a first radio frequency chain that is configured to process signals in a first frequency range (e.g., L1 signals or L5 signals). The device can turn on a second radio frequency chain that is configured to process signals in the second frequency range (e.g., L1 signals or L5 signals).

B. Sequence for Performing Tuning of L1 and L5 Antennas

GNSS navigation may include an acquisition mode and a tracking mode. In the acquisition mode, L1 signals from GNSS satellites are initially detected and used to establish a communication channel. Measurements over the communication channel are used to establish an initial location for the mobile device. Afterwards, a combination of L1 and L5 signals, or just L5 signals, can be used to update the mobile device's location during the tracking mode. The search space in the acquisition phase is considerably larger than the search space in the tracking phase, which determines a global location for the mobile device, because the tracking phase is used to monitor devices position relative to the initial location determined following the acquisition mode. In this manner, acquisition (which is better for L1) can be more efficient, while still allowing the greater accuracy provided by L5 signals.

Accordingly, when the mobile device is in an acquisition mode, the mobile device can connect the L1 antenna element to circuitry that is configured to tune the L1 antenna elements to receive L1 signals. After the initial location has been determined or just the communication channel has been established, the mobile device can connect the L5 antenna elements to circuitry that is configured to receive the combination of L1 and L5 signals or just L5 signals. In addition, different signal types can vary in accuracy, thermal resistance, or energy consumption. Accordingly, the mobile device may tune the antenna for an appropriate signal type based on the device's current movement, temperature, or battery capacity.

1. L1 for Acquisition and L5 for Tracking

In some embodiments, the L1 antenna is used for the acquisition mode but the L5 antenna is not. And the L5 antenna is used for the tracking mode, but the L1 antenna is not.

Figure 8:
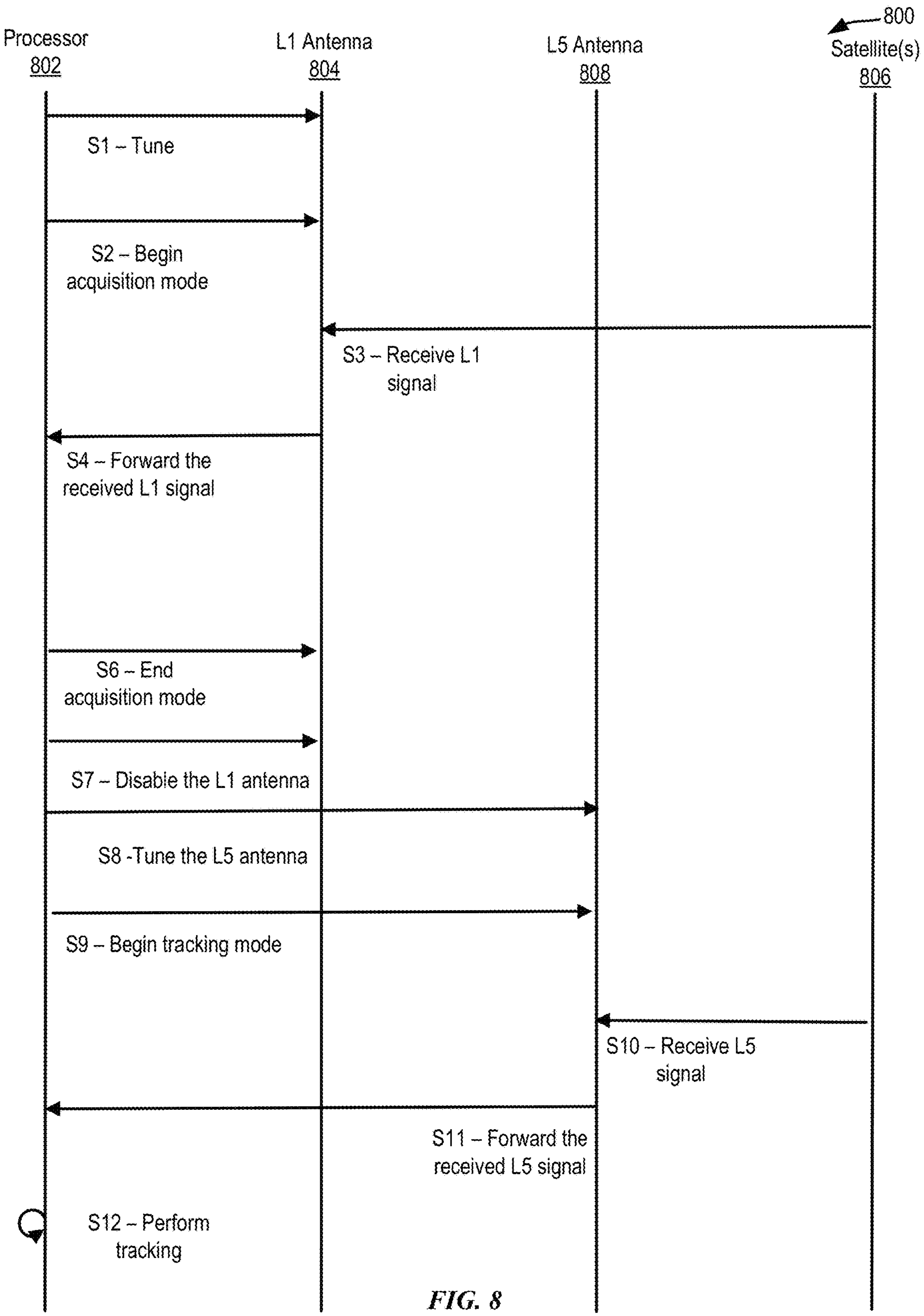
FIG. 8 is a sequence diagram where L1 signals are used for acquisition and L5 signals are used for tracking according to various embodiments.

FIG. 8 is a sequence diagram 800 where L1 signals are used for acquisition and L5 signals are used for tracking according to various embodiments. Although FIG. 8 is described with respect to L1 and L5 signals and antennas, embodiments can also be used with other types of signals and antennas.

At S1, processor 802 can cause L1 antenna 804 to be tuned to receive L1 signals. The processor can tune the L1 antenna 804 by instructing a receiver (e.g., receiver 510) to connect an appropriate tuning bank (e.g., one of tuning bank(s) 520) to the L1 antenna 804, which can comprise an RF chain (e.g., L1 RF chain 725).

At S2, the acquisition mode can begin. The acquisition mode can perform as described herein and as will be understood by the skilled person. As part of the acquisition mode, the processor 802 can cause the L1 antenna 804 to forward received signals to processor 802.

At S3, an L1 signal can be received at the L1 antenna 804 from the satellite(s) 806. L1 signals can be received from multiple distinct satellite(s) 806 (e.g., GNSS satellites 20).

At S4, the received L1 signal can be forwarded to the processor 802. The processor 802 can use the received signal to acquire a connection with the satellite(s) 806 and determine a position for the L1 antenna 804. Steps S3 and S4 can repeat until a connection is acquired and the sequence may not proceed to S6 until a connection is established.

At S6, the acquisition mode can end and the processor 802 can instruct the L1 antenna 804 to stop forwarding received L1 signals to the processor 802.

At S7, the processor 802 can disable the L1 antenna 804. Disabling the L1 antenna 804 can mean disconnecting the tuning bank that was connected to the L1 antenna 804 at S1.

At S8, the processor 802 can tune the L5 antenna 808. The processor 802 can tune the L5 antenna 808 by causing the L5 antenna 808 to be connected to an appropriate tuning bank. In some embodiments, the L1 antenna 804 and the L5 antenna 808 can be the same antenna or part of the same antenna array.

At S9, the tracking mode can begin and the processor 802 can cause the L5 antenna 808 to forward received signals.

At S10, a L5 signal can be received at the L5 antenna 808 from the satellite(s) 806. During the tracking mode, multiple L5 signals can be received from different satellite(s) 806.

At S11, the received L5 signal can be forwarded to the processor 802.

At S12, the processor 802 can use the forwarded signal can be used to perform tracking. Tracking can be performed by determining a distance between the L5 antenna 808 and the satellite(s) 806. For example, a time-of-flight measurement for a L5 signal can be used to determine the distance between the L5 antenna 808 and one or more satellite(s) 806. Multiple L5 signals may be needed to track the location for L5 antenna 808 and S10 and S11 can be repeated for multiple different satellite(s) 806 for the duration of the tracking mode.

2. L1 for Acquisition and L1+L5 for Tracking

In some embodiments, the L1 antenna is used for the acquisition mode and both the L1 antenna and the L5 antenna are used for the tracking mode.

Figure 9:
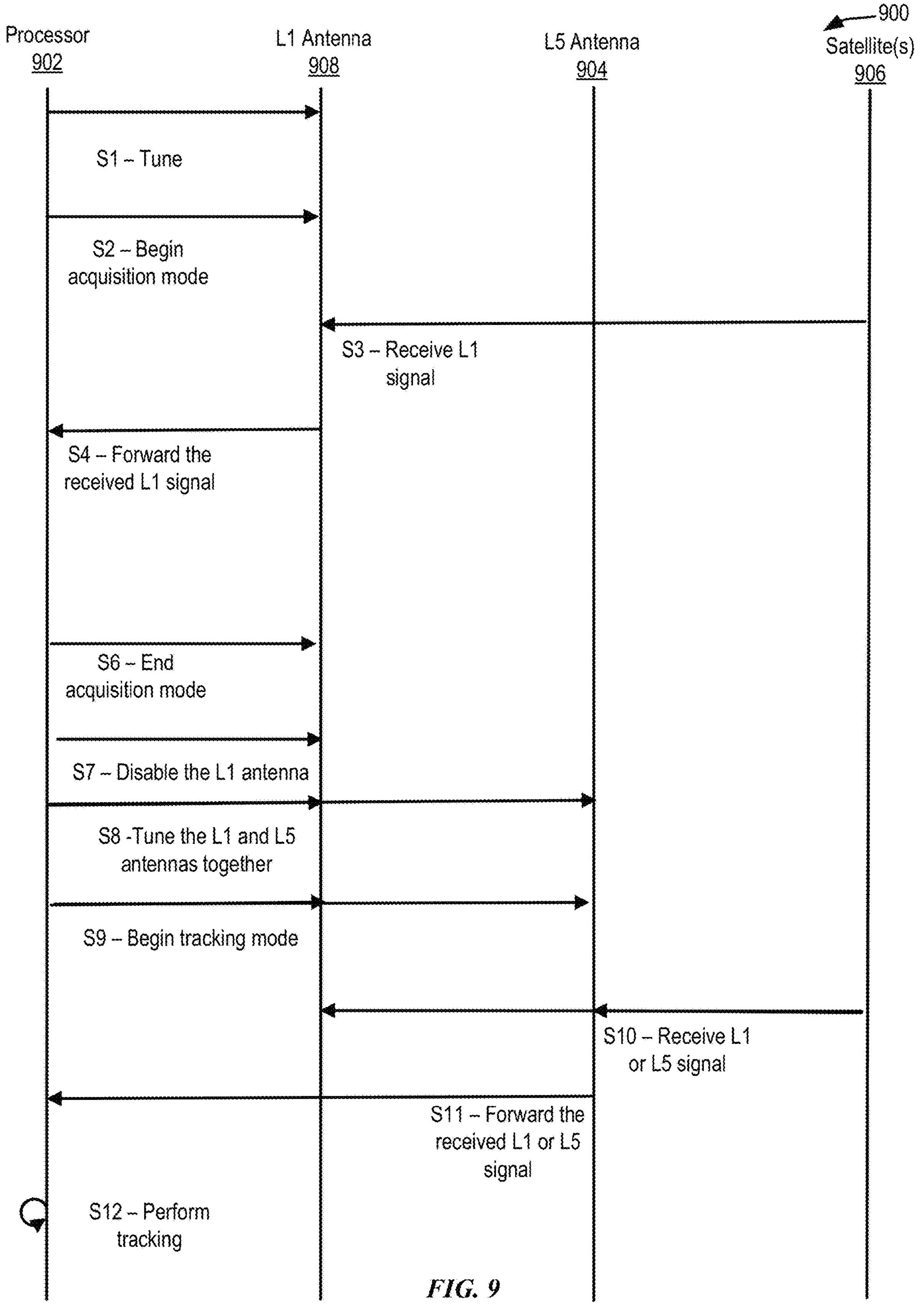
FIG. 9 is a sequence diagram where L1 signals are used for acquisition and a combination of L1 and L5 signals are used for tracking according to various embodiments.

FIG. 9 is a sequence diagram 900 where L1 signals are used for acquisition and a combination of L1 and L5 signals are used for tracking according to various embodiments. Although FIG. 9 is described with respect to L1 and L5 signals and antennas, embodiments can also be used with other types of signals and antennas.

At S1, processor 902 can cause L1 antenna 904 to be tuned to receive L1 signals. The processor can tune the L1 antenna 904 by instructing a receiver to connect an appropriate tuning bank (e.g., one of tuning bank(s) 520) to the L1 antenna 904, which can comprise an RF chain (e.g., RF chain 725).

At S2, the acquisition mode can begin. The acquisition mode can perform as described herein and as will be understood by the skilled person. As part of the acquisition mode, and the processor 902 can cause the L1 antenna 904 to forward received signals to processor 902.

At S3, a L1 signal can be received at the L1 antenna 904 from the satellite 906. L1 signals can be received from multiple distinct satellite(s) 906 (e.g., GNSS satellites 20).

At S4, the received L1 signal can be forwarded to the processor 902. The processor 902 can use the received signal to acquire a connection with the satellite 906 and determine a position for the L1 antenna 904. Steps S3 and S4 can repeat until a connection is acquired and the sequence may not proceed to S6 until a connection is established.

At S6, the acquisition mode can end and the processor 902 can instruct the L1 antenna 904 to stop forwarding received L1 signals to the processor 902.

At S7, the processor 902 can disable the L1 antenna 904. Disabling the L1 antenna 904 can mean disconnecting the tuning bank that was connected to the L1 antenna 904 at S1.

At S8, the processor 902 can tune the L1 antenna 904 and the L5 antenna 908 together. The L1 antenna 904 and the L5 antenna 908 can be configured so that both L1 and L5 signals can be received. The processor 902 can tune the L1 antenna 904 and the L5 antenna 908 by causing the L1 antenna 904 and the L5 antenna 908 to be connected to appropriate tuning banks. In some embodiments, the L1 antenna 904 and the L5 antenna 908 can be the same antenna or part of the same antenna array.

At S9, the tracking mode can begin and the processor 902 can cause the L1 antenna 904 and the L5 antenna 908 to forward received signals.

At S10, a L1 or L5 signal can be received at the L1 antenna 904 or the L5 antenna 908 from the satellite(s) 906. During the tracking mode, multiple L1 or L5 signals can be received from different satellite(s) 906.

At S11, the received L1 or L5 signal can be forwarded to the processor

902.

At S12, the processor 902 can use the forwarded signal can be used to perform tracking. Tracking can be performed by determining a distance between the L1 antenna 904 or the L5 antenna 908 and the satellite(s) 906. For example, a time-of-flight measurement for a L1 or L5 signal can be used to determine the distance between the L1 antenna 904 or the L5 antenna 908 and one or more satellite(s) 206. Multiple L1 or L5 signals may be needed to track the location for L1 antenna 904 or the L5 antenna 908 and S10 and S11 can be repeated for multiple different satellite(s) 906 for the duration of the tracking mode.

C. Method for Antenna Tuning

Figure 10:
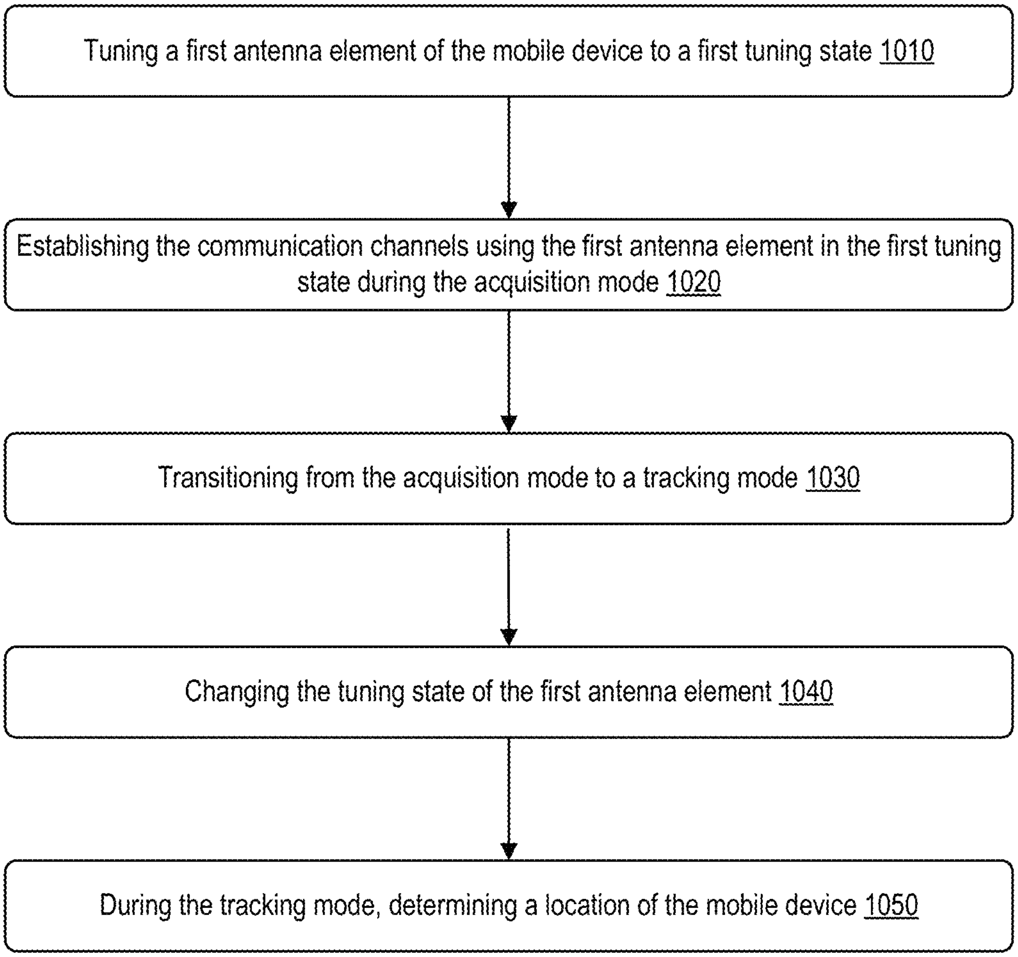
FIG. 10 is a flowchart illustrating a method for performing antenna tuning according to various embodiments.

FIG. 10 is a flowchart illustrating a method 1000 for performing antenna tuning according to various embodiments. In some implementations, one or more method blocks of FIG. 10 may be performed by a mobile device (e.g., user equipment 12, electronic device 1200). In some implementations, one or more method blocks of FIG. 10 may be performed by another device or a group of devices separate from or including the mobile device. Additionally, or alternatively, one or more method blocks of FIG. 10 may be performed by one or more components of the mobile device, such as processor 22, memory 24, nonvolatile storage 26, input structures 30, network interface 34, sensors 37, GNSS receiver 48, antenna 50, processor 505, receiver 510, antenna 525*a*-525*n*, processor 1218, computer-readable medium 1202, Input/Output (I/O) subsystem 1206, wireless circuitry 1208, etc.

At block 1010, a first antenna element of the mobile device can be tuned to a first tuning state. The first tuning state can be configured for establishing communication channels with a plurality of satellites (e.g,. GNSS satellites 20). The first tuning state can configure the first antenna element to (e.g., antenna 50, antennas 525*a*-525*n*, L1 antenna 710, L5 antenna 715) receive signals (e.g., L1 signals, L5 signals) in a first frequency range. The first antenna element can be tuned to a first tuning state by connecting a tuning bank to the first antenna element (e.g., tuning bank(s) 520). The first frequency range can be a L1 frequency range, a L5 frequency range, or a combined L1 and L5 frequency range. A L1 frequency range can be a range centered on 1575.42 megahertz (MHz), a L5 frequency range can be centered on 1176.45 MHz, and a combined L1 and L5 frequency range can be centered between 1575.42 MHz and 1176.45 MHz inclusive.

At block 1020, communication channels can be established using the first antenna element in the first tuning state during the acquisition mode. The communication channels can be established between the first antenna element and at least one satellite. Establishing communication channels can include determining a position for the mobile device.

At block 1030, the mobile device can transition from the acquisition mode to a tracking mode. Transitioning from the acquisition mode and the tracking mode can include determining that the mobile device is in a low power mode. The mobile device can be in a low power mode if the battery capacity is below a threshold. A first radio frequency (RF) chain can be turned off in response to the detected low power mode. The RF chain can be configured to process signals in the first frequency range. A second RF chain that is configured to process signals in the second frequency range can be turned on.

At block 1040, the tuning state of the first antenna element can be changed. The tuning state can be changed by disconnecting the tuning bank that was connected at block 1010, connecting a second tuning bank (e.g., tuning bank(s) 520, tuning banks 705) in addition to the tuning bank that was connected at block 1010, or replacing the tuning bank that was connected at 1010 with a new tuning bank.

At block 1050, a location of the mobile device can be determined during the tracking mode. The location can be determined using the first antenna element and a second antenna element of the mobile device. The location can be determined using the first antenna element and using the second antenna element that is configured to receive signals in a second frequency range. The second frequency range can be a L1 frequency range, a L5 frequency range, or a combined L1 and L5 frequency range. During the tracking mode, the mobile device can determine that the device is in a low power mode or a thermal mode, the mobile device can tune the first antenna element of the mobile device to the first tuning state, and the mobile device can determine the device's location using the first antenna element.

In response to failing to determine the location of the mobile device at 1050, the mobile device can transition from the tracking mode to the acquisition mode. The first antenna element can be tuned to the first tuning state during the acquisition mode.

Determining that the device is in a thermal mode can include, determining thermal state for the mobile device, providing the thermal inputs as input to a model, receiving a probability that the mobile device is in the thermal state as output from the model, and classifying the mobile device as being in a thermal state in response to the probability exceeding a threshold. A thermal mode can be when the mobile device's temperature is above a temperature threshold, or when the likelihood that the mobile device's temperature will exceed a temperature threshold exceeds a probability threshold.

Method 1000 may include additional implementations, such as any single implementation or any combination of implementations described below and/or in connection with one or more other processes described elsewhere herein.

Although FIG. 10 shows example blocks of method 1000, in some implementations, method 1000 may include additional blocks, fewer blocks, different blocks, or differently arranged blocks than those depicted in FIG. 10. Additionally, or alternatively, two or more of the blocks of method 1000 may be performed in parallel.

V. Thermal Management

A mobile device's temperature can be stabilized to optimize signal acquisition and tracking for GNSS tracking and other location-based functionality. Thermal management can include delaying GNSS signal acquisition until the temperature is stabilized and/or changing the execution of processes on the mobile device to stabilize the temperature. Also, different signal types may be more resistant to interference from thermal events and thermal management can include changing the GNSS signal type in response to a thermal state.

A. Thermal Manager

A thermal event can be when a device overheats (e.g., the device is in a thermal state). As the mobile device's operating temperature increases, the frequency for oscillators in the mobile device can increase. Increased oscillator frequency can reduce the reliability GNSS signal acquisition, and, in some circumstances, the mobile device operating in a tracking mode may lose tracking during a thermal event. L5 signals are more computationally demanding for the mobile device and, accordingly, a mobile device experiencing a thermal event may not be able to process L5 signals as efficiently as less complex L1 signals.

To improve tracking during a thermal event, the mobile device can change the tuning state to favor L1 signals during a thermal event. The mobile device's thermal manager may detect a thermal event by measuring the temperature at one or more points in the mobile device. If the temperature is above a threshold, the mobile device may change the tuning state by connecting the antenna to a tuning bank that is configured for L1 signals. After the temperature falls below the threshold, the mobile device may change the tuning state to favor L5 signals or a combination of L1 and L5 signals.

The mobile device may use a predictive model to determine if a thermal event is likely and change the tuning state based on the model's predictions. The input to the model can include thermal inputs for the device, the thermal inputs comprising one or more of the current temperature, higher order derivatives of the current temperature, the current applications running on the mobile device, the time of day, the device's current location, weather data for the current location, the current day, or the frequency of user interactions with the mobile device. In addition, the mobile device can use a rules-based approach to determine if a mobile device should prepare for a thermal event by changing the device's tuning state. For instance, a rule could be to prepare for a thermal event (e.g., by changing the tuning state) if a particular application is opened and the temperature is above a threshold.

1. Identifying Thermal Processes

Thermal stabilization may be more effective if the mobile device has advanced notice of a likely thermal event. Identifying thermal processes during execution can allow the device to respond to a thermal state that has already occurred, but identifying queued thermal processes may mean that a thermal state can be prevented or mitigated. Accordingly, the mobile device may use various techniques to identify thermal processes.

A machine learning model may be used to identify thermal processes in some embodiments. A "machine learning model" (ML model) can refer to a software module configured to be run on one or more processors to provide a classification or numerical value of a property of one or more samples. An ML model can be generated using sample data (e.g., training data) to make predictions on test data. One example is an unsupervised learning model. Another example type of model is supervised learning that can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data pre-processing, handling imbalanced datasets, statistical relational learning, or Proaftn, a multicriteria classification algorithm. The model may include linear regression, logistic regression, deep recurrent neural network (e.g., long short-term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

The mobile device may use this predictive model to determine if a queued process is likely to cause a temperature change. This model can be trained to predict thermal processes using data from past thermal events. The training data from past thermal events can include thermal inputs for the device. These thermal inputs can include the current applications running on the mobile device and the current processes executing on the device.

Thermal inputs corresponding to past thermal events can be used to train a model to predict whether a particular process is likely to cause a thermal event. For example, the thermal inputs for a past thermal event can be labeled training data for the model. In this case the label can be whether a thermal even occurred. To train the model, the thermal inputs are provided to the model and the model's parameters are iteratively updated until the model correctly predicts the label (e.g., thermal event or no thermal event) corresponding to the thermal inputs. Once trained, the model can be used to classify unlabeled data (e.g., a mobile device's current thermal inputs).

In addition or alternatively, the mobile device can use a rules-based approach to determine if a process is a thermal process. Some processes may be likely to result in a thermal event, and rules may be created to identify these processes. For instance, a rule could be to prepare for a thermal event (e.g., by changing the tuning state) if a set of processes that were previously associated with a thermal event are queued for execution. These rules can be identified by analyzing thermal inputs corresponding to past thermal events. The rules can include rules (e.g., thresholds) based on any combination of: the expected wireless transmit throughput, expected GPU/neural processing unit (NPU) utilization, expected display utilization, etc.

An application can identify thermal processes in some embodiments. A process can be executable programmed instructions corresponding to a software application (e.g., one or more threads). The application may provide information about a process' likelihood of causing a thermal event to the thermal manager. In some embodiments, a thermal manager may observe the behavior of a process to determine if it a thermal process (e.g., a process that is likely to cause a thermal state). For example, the thermal manager may record whether a thermal event occurs in proximity to the execution of the process and the mobile device may calculate the probability that the execution of the process leads to a thermal state.

Components of the mobile device may be associated with thermal states. For example, power amplifiers may be likely to cause a thermal state in some devices. A process may identify which components are used by the process, or a thermal manager can monitor components that are used during the execution of the process. The thermal manager can classify a process as a thermal process depending on the components used during the execution of the process.

2. GNSS Signal Environment and Thermal Management

In some embodiments, a thermal manager may use information about the GNSS signal environment to determine whether thermal stabilization is feasible. Thermal stabilization may not be feasible if acquiring a GNSS signal would take too long. For example, the mobile device may determine that there is not enough charge in the device's battery to stabilize the temperature for the time period necessary for signal acquisition.

A mobile device may have access to information about its current signal environment. The information about the signal environment may indicate a predicted time to acquire a signal. This information can include information indicating whether the current environment is urban or rural, whether the device is indoors or outdoors, or other environmental factors. This information can be provided to the mobile device (e.g., from a database), or the mobile device can use previous attempts at GNSS signal acquisition to characterize the signal environment.

If the mobile device is in a difficult signal environment, the thermal manager may determine that signal acquisition would take too long for thermal stabilization to be feasible. For example, thermal stabilization may not be feasible because too much power would be consumed by dummy processes in the current signal environment (e.g., the acquisition stage in the current signal environment would be sufficiently long that the energy consumed by dummy processes during stabilization would exceed a threshold/damage components). In some circumstances, thermal stabilization may involve maintaining device temperatures that could damage components. In such circumstances, the thermal manager may proceed with signal acquisition without thermal stabilization, or the thermal manager may delay signal acquisition until the signal environment is more favorable.

3. Priority and Thermal Management

A thermal manager can use priorities for different processes to determine whether to delay or modify a processes execution during thermal management. For example, processes may be assigned an execution priority that determines the order in which processes are executed. The execution priority for a queued process can be used to determine whether the thermal manager can modify the execution of the process or if the process should be allowed to execute regardless of a mobile device's thermal state. For instance, the thermal manager may delay a low priority process, but a high priority process may not be delayed in some circumstances.

The thermal manager may take the priority of a process requesting thermal management (e.g., the requesting process) into account when determining whether to change the execution of a thermal process. A process may request thermal stabilization through a request for GNSS navigation. However, the thermal manager may check priorities before stabilizing temperatures, and the priority of the requesting process can be compared against the priority of queued thermal processes before deciding whether to delay or modify the queued processes. For example, the thermal manager may delay the execution of thermal processes that have a priority that is equivalent or lower than the requesting process, but thermal management may not happen if a high priority thermal process is queued. In addition, or alternatively, some thermal processes may have a priority that indicates that the process cannot be delayed under any circumstances. Similarly, a process may have a priority that indicates that it can delay thermal processes with any priority, and, for example, an emergency SOS message could have such a priority.

4. Thermal Scores

A thermal score can be assigned to a thermal process, and, in addition to priority, the thermal manager may use a process' thermal score to determine whether to control the execution state of the process. Thermal processes may have different impacts on a mobile device's thermal state. For example, a first process may cause a slight change in the device's temperature, while a second process may cause a severe temperature change. Instead of treating both processes the same, a thermal scores can allow the thermal manager to make nuanced decisions about the risk posed by each process. The thermal manager can take various actions to control the execution state of a process including, delaying, moving up, or altering the execution of the controlled process. For example, the thermal manager may delay the execution of a process with a high thermal score during signal acquisition, and a process with a low thermal score may be allowed to execute.

The thermal score can take different forms. The thermal score can be a binary score that indicates whether a process is a thermal process, or the thermal score can include gradations that indicate the severity of the expected temperature change caused by the process. For example, the thermal scores can include the following categories: no thermal risk, moderate thermal risk, and severe thermal risk. The thermal scores can be based on a rate of temperature change associated with each process, or an expected difference in temperature before and after the execution of the process. Any number of separate thermal scores can be used and the score can be a continuous value such as the rate of temperature change of a process.

Thermal scores can be used to stabilize a mobile device's temperature. In some embodiments, the thermal manager can determine a total thermal score for processes that are currently executing. The thermal manager may have access to a queue of pending processes (e.g., a process queue), and each queued process can have a thermal score. In response to a request for thermal stability, the thermal manager can change the order of the queued processes so that the total thermal score remains stable for the duration of a temperature sensitive process (e.g., GNSS acquisition). For example, if the thermal manager determines that a first thermal process is concluding, the thermal manager can change the order of the queue so that a second thermal process, with an equivalent thermal score, initiates at the conclusion of the first process.

The thermal manager may consider both the thermal score and priority when managing the process queue. Continuing the example, the first thermal process may have a high priority and the second thermal process may have a low priority. Instead of initiating the second thermal process at the conclusion of the first thermal process, the thermal manager may identify a third thermal process that has both the same priority and the same thermal score as the first thermal process. Instead of the second thermal process, this third thermal process can be initiated at the conclusion of the first process.

The thermal manager may change the queue position of multiple processes to stabilize a mobile device's temperature. For example, the thermal manager may detect that two processes are concluding: a first process classified as having no thermal risk, and a second thermal process that is classified as having a severe thermal risk. The thermal scores may be designed with a predetermined ratio between each score, and, for example, two thermal processes with a moderate thermal risk may cause a similar change in temperature to a single severe thermal risk process. In such circumstances, the thermal manager may, at the conclusion of the first and second process, change the queue order to initiate a third and fourth thermal process that are each assigned a moderate thermal risk. In addition, or alternatively, the thermal score can be a rate of temperature change, and the thermal manager may change the queue order so that the aggregate rate of change of all executing processes is maintained. In some embodiments, a process may have different thermal scores at different points in the execution of the process, and, for example, the first 20 seconds of a process may be a severe thermal risk while the remaining 30 seconds may be a moderate thermal risk.

B. Method for Thermal Management

Figure 11:
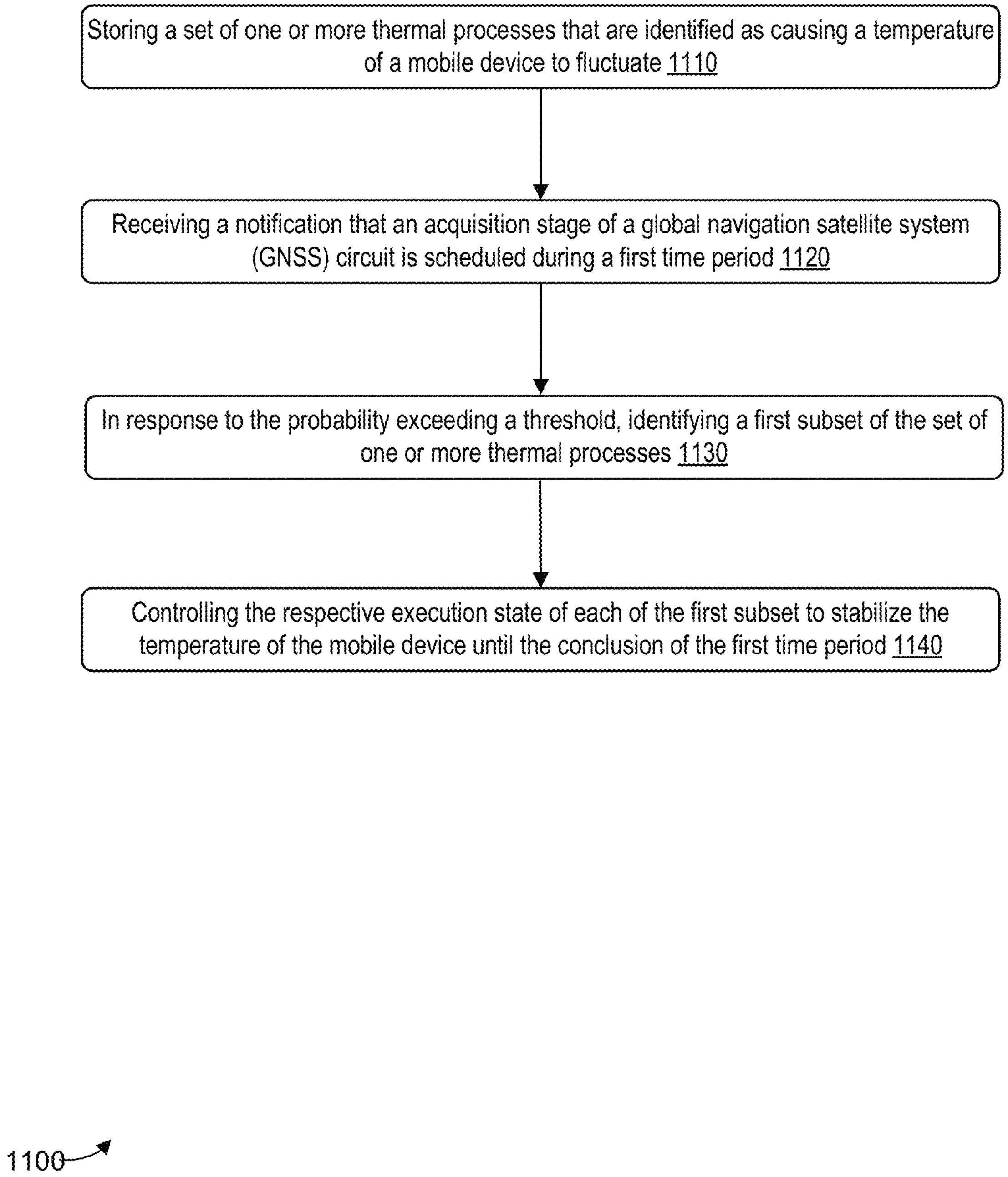
FIG. 11 is a flowchart illustrating a method for thermal management according to various embodiments.

FIG. 11 is a flowchart illustrating a method for thermal management according to various embodiments. In some implementations, one or more method blocks of FIG. 11 may be performed by a mobile device (e.g., user equipment 12, electronic device 1200). In some implementations, one or more method blocks of FIG. 11 may be performed by another device or a group of devices separate from or including the mobile device. Additionally, or alternatively, one or more method blocks of FIG. 11 may be performed by one or more components of the mobile device, such as processor 22, memory 24, nonvolatile storage 26, input structures 30, network interface 34, sensors 37, GNSS receiver 48, antenna 46, antenna 50, processor 505, receiver 510, antenna 525*a*-525*n*, processor 1218, computer-readable medium 1202, Input/Output (I/O) subsystem 1206, wireless circuitry 1208, etc.

At block 1110, a set of the one or more thermal processes can be stored. For instance, the thermal processes can be stored in a memory of the mobile device. The thermal processes can be processes that are identified as causing a temperature of the mobile device to fluctuate. The device's temperature may fluctuate if the rate of temperature change, the magnitude of the temperature change, or a combination of the rate and magnitude of temperature change are above respective thresholds. The mobile device may use one or more of a machine learning model or rules to identify thermal processes (e.g., processes that are likely to cause change in a thermal state). In some embodiments, the processes can be associated with applications, and each application can identify thermal processes associated with the application.

Identifying a thermal process can mean distinguishing processes that do not cause temperature fluctuations (e.g., a thermal event; a thermal state) and thermal processes that do cause temperature fluctuations. In some embodiments, a thermal score can be assigned to processes. This score can indicate an expected temperature change caused by the execution of the process. The set of one or more thermal processes can include some or all of the processes associated with the mobile device's code (e.g., software, firmware, or applications installed on the mobile device).

A thermal score can be assigned to each of the set of one or more thermal processes. The scores can be assigned by the thermal manager or the mobile device, and, in some embodiments, the programs associated with each process can provide information identifying a thermal score corresponding to each process. The thermal score for a process can represent a probability that the corresponding process will cause the temperature to fluctuate (e.g., cause the temperature or change in temperature to be above a threshold). The thermal score may indicate a magnitude of the temperature change caused by the process' execution. A first value for a total thermal score can be calculated, and the total score can represent the aggregate thermal score of the currently executing processes, the processes that are scheduled to execute during the first time period, or a combination of both. In some embodiments, the total thermal score may use the priority, or execution time, of each process as weights when calculating the total thermal score. A process can execute during the first time period if at least part of the execution of the process occurs during the first time period.

At block 1120, a notification that an acquisition stage of a global navigation satellite system (GNSS) circuit is scheduled during a first time period can be received. The notification can be received at a thermal manager of the mobile device. The GNSS circuit can include any of the elements disclosed in diagram 700. The first time period can be a time period corresponding to a GNSS acquisition stage, and, for instance, the first time period can correspond to a coherent integration time. The first time period may last until the acquisition time has concluded, and the first time period can be extended or shortened based on whether a signal has been acquired. The first time period may correspond to an average acquisition time for the mobile device in its current GNSS signal environment.

At block 1130, a first subset of the set of one or more thermal processes (e.g., thermal antagonists) can be identified. The one or more thermal processes can be the set of one or more thermal processes from block 1110. The first subset can correspond to thermal processes that are currently in a process queue or to thermal processes with queue positions indicating that the processes will likely execute during the first time period (e.g., the probability of execution is above a threshold). The thermal processes can have a thermal score that identifies the likelihood that the process causes a thermal event. The process can have thermal score, a priority, or both a thermal score and a priority. Identifying the first subset can include identifying one or more of a thermal score and a priority of the processes comprising the first subset. In some embodiments, the thermal score may be assigned by a model, by applying rules to the process, or by a combination of both.

At block 1140, the respective execution state of each of the first subset can be controlled to stabilize the temperature of the mobile device until a conclusion of the first time period. Controlling the execution of the processes in the first subset can include delaying the execution of one or more of the processes, advancing the execution of tone or more of the processes, or modifying the execution of the one or more processes. Advancing or delaying the execution of one or more of the processes can include changing the order of queued processes (e.g., to move thermal processes back in the queue or moving them forward in the queue).

Delaying the execution of the first subset can mean stopping the execution of processes unrelated to GNSS signal acquisition during, or preceding, the acquisition stage. In some embodiments, delaying the execution of the first subset can include stopping the execution of processes with a thermal score above a threshold while permitting the execution of processes with a thermal score below a threshold. The priority of each process may be considered when determining whether to advance, delay, or modify the execution of processes. Modifying the execution of a process can include causing the process to continue until the conclusion of the first time period.

In some embodiments, the acquisition stage of the GNSS circuit can be initiated during the first time period. In some embodiments, the acquisition stage of the GNSS circuit can be delayed until a second time period that follows the first time period. Controlling the execution state of each first subset can be used to stabilize the temperature of the mobile device or the oscillator of the mobile device. Stabilizing the temperature can mean keeping the temperature of the mobile device, or oscillator, below a threshold, or keeping the rate of change of the temperature below a threshold. If the temperature has been stabilized, the mobile device may optimize the acquisition stage of the GNSS circuit for a temperature stable mobile device or a temperature stable oscillator. The optimization can include one or more of reducing the doppler frequency offset and the time delay offset for the local signals that are compared to received signals during the acquisition stage. The temperature of the mobile device can be an oscillator temperature or an oscillator frequency.

A second subset of the one or more thermal processes can be identified, and the second subset can comprise one or more of an ordered set of processes in a process queue. The second subset can include processes that are not scheduled to execute during the first time period, or processes with queue positions that suggest that the processes will not execute during the first time period. During the first time period, the mobile device (e.g., the mobile device or the thermal manager) can detect a change in the total thermal score from the first value to a second value. The change can be caused by the conclusion of one or more of the thermal processes in the first subset. The mobile device can change the queue position (e.g., the position within the process queue) for one or more of the second subset. For example, the mobile device can move the one or more processes to the front of the process queue so that the processes begins to execute. The mobile device may change the execution of one or more processes until the total thermal score returns to within a threshold magnitude of the first value.

Determining that the device is in a thermal mode (e.g., a thermal state) can include, determining thermal state for the mobile device, providing the thermal inputs as input to a model, receiving a probability that the mobile device is in the thermal state as output from the model, and classifying the mobile device as being in a thermal state in response to the probability exceeding a threshold. A thermal mode can be when the mobile device's temperature is above a temperature threshold, or when the likelihood that the mobile device's temperature will exceed a temperature threshold exceeds a probability threshold.

Method 1100 may include additional implementations, such as any single implementation or any combination of implementations described below and/or in connection with one or more other processes described elsewhere herein.

Although FIG. 11 shows example blocks of method 1100, in some implementations, method 1100 may include additional blocks, fewer blocks, different blocks, or differently arranged blocks than those depicted in FIG. 11. Additionally, or alternatively, two or more of the blocks of method 1100 may be performed in parallel.

VI. Example Device

Figure 12:
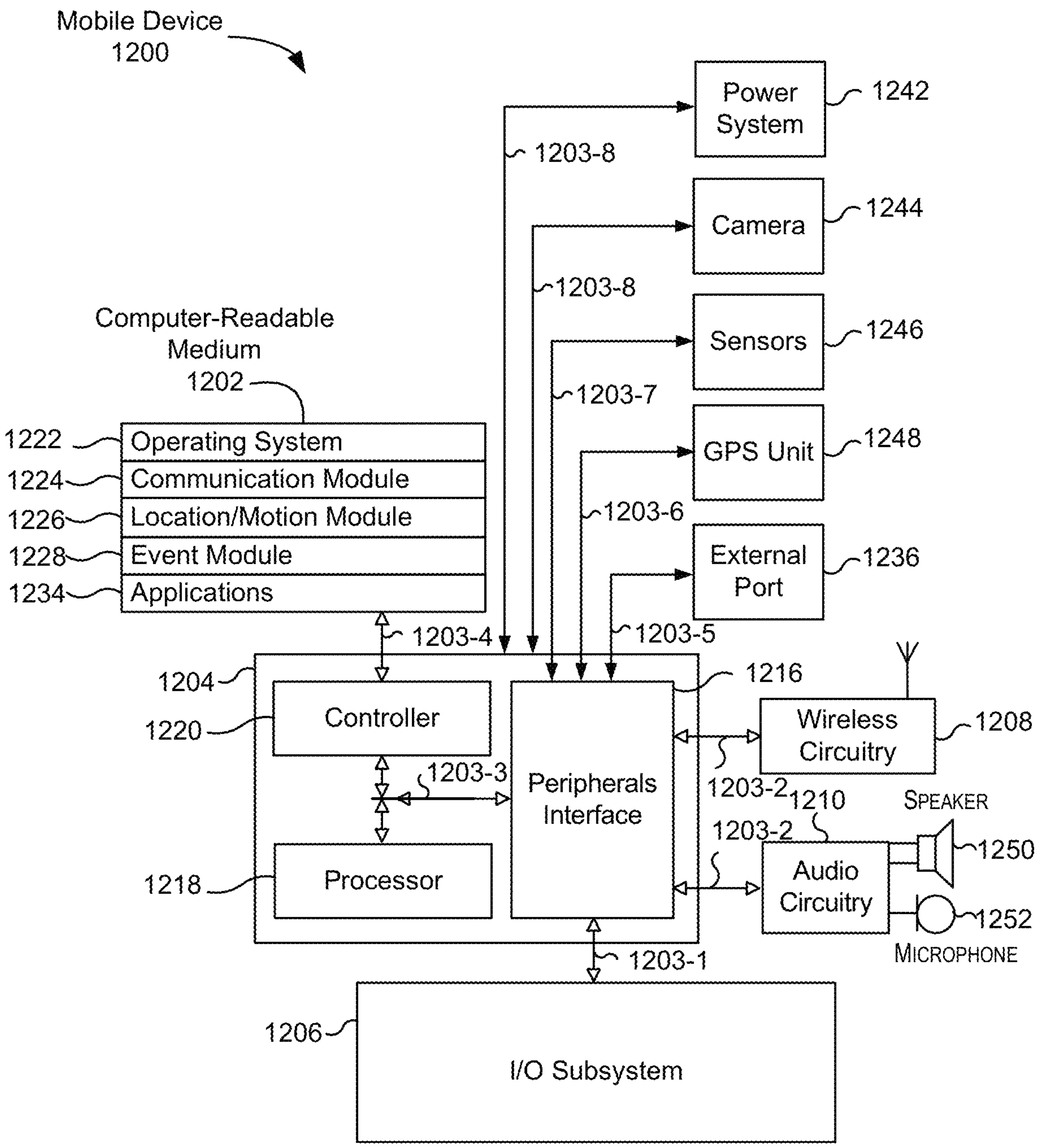
FIG. 12 is a block diagram of an example electronic device according to various embodiments.

FIG. 12 is a block diagram of an example electronic device 1200 according to various embodiments. Device 1200 generally includes computer-readable medium 1202, a processing system 1204, an Input/Output (I/O) subsystem 1206, wireless circuitry 1208, and audio circuitry 1210 including speaker 1212 and microphone 1214. These components may be coupled by one or more communication buses or signal lines 1203. Device 1200 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

it should be apparent that the architecture shown in FIG. 12 is only one example of an architecture for device 1200, and that device 1200 can have more or fewer components than shown, or a different configuration of components. The various components shown in FIG. 12 can be implemented in hardware, software, or a combination of both hardware and software, including one or more signal processing and/or application specific integrated circuits.

Wireless circuitry 1208 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 1208 can use various protocols, e.g., as described herein. In various embodiments, wireless circuitry 1208 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VOIP), near field communication protocol (NFC), a protocol for email, instant messaging, and/or a short message service (SMS), or any other suitable communication protocol, including communication protocols not yet developed as of the filing date of this document.

Wireless circuitry 1208 is coupled to processing system 1204 via peripherals interface 1216. Peripherals interface 1216 can include conventional components for establishing and maintaining communication between peripherals and processing system 1204. Voice and data information received by wireless circuitry 1208 (e.g., in speech recognition or voice command applications) is sent to one or more processors 1218 via peripherals interface 1216. One or more processors 1218 are configurable to process various data formats for one or more application programs 1234 stored on medium 1202.

Peripherals interface 1216 couple the input and output peripherals of device 1200 to the one or more processors 1218 and computer-readable medium 1202. One or more processors 1218 communicate with computer-readable medium 1202 via a controller 1220. Computer-readable medium 1202 can be any device or medium that can store code and/or data for use by one or more processors 1218. Computer-readable medium 1202 can include a memory hierarchy, including cache, main memory and secondary memory. The memory hierarchy can be implemented using any combination of random access memory (RAM) (e.g., static random access memory (SRAM,) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 1216, one or more processors 1218, and controller 1220 can be implemented on a single chip, such as processing system 1204. In some other embodiments, they can be implemented on separate chips.

Processor(s) 1218 can include hardware and/or software elements that perform one or more processing functions, such as mathematical operations, logical operations, data manipulation operations, data transfer operations, controlling the reception of user input, controlling output of information to users, or the like. Processor(s) 1218 can be embodied as one or more hardware processors, microprocessors, microcontrollers, field programmable gate arrays (FPGAs), application-specified integrated circuits (ASICs), or the like.

Device 1200 also includes a power system 1242 for powering the various hardware components. Power system 1242 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1200 includes a camera 1244. In some embodiments, device 1200 includes sensors 1246. Sensors can include accelerometers, compass, gyrometer, pressure sensors, audio sensors, light sensors, barometers, and the like. Sensors 1246 can be used to sense location aspects, such as auditory or light signatures of a location.

In some embodiments, device 1200 can include a GPS receiver, sometimes referred to as a GPS unit 1248. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1218 run various software components stored in medium 1202 to perform various functions for device 1200. In some embodiments, the software components include an operating system 1222, a communication module 1224 (or set of instructions), a location module 1226 (or set of instructions), a ranging module 1228 that is used as part of ranging operation described herein, and other application programs 1234 (or set of instructions).

Operating system 1222 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1224 facilitates communication with other devices over one or more external ports 1236 or via wireless circuitry 1208 and includes various software components for handling data received from wireless circuitry 1208 and/or external port 1236. External port 1236 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1226 can assist in determining the current position (e.g., coordinates or other geographic location identifiers) and motion of device 1200. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1226 receives data from GPS unit 1248 and analyzes the signals to determine the current position of the mobile device. In some embodiments, location/motion module 1226 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1208 and is passed to location/motion module 1226. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1200 based on the position coordinates of the corresponding transmitters. Regardless of the specific location technology used, location/motion module 1226 receives information from which a location fix can be derived, interprets that information, and returns location information, such as geographic coordinates, latitude/longitude, or other location fix data.

Ranging module 1228 can send/receive ranging messages to/from an antenna, e.g., connected to wireless circuitry 1208. The messages can be used for various purposes, e.g., to identify a sending antenna of a device, determine timestamps of messages to determine a distance of electronic device 1200 from another device. Ranging module 1228 can exist on various processors of the device, e.g., an always-on processor (AOP), a UWB chip, and/or an application processor. For example, parts of ranging module 1228 can determine a distance on an AOP, and another part of the ranging module can interact with a sharing module, e.g., to display a position of the other device on a screen in order for a user to select the other device to share a data item. Ranging module 1228 can also interact with a reminder module that can provide an alert based on a distance from another mobile device.

The one or more applications 1234 on device 1200 can include any applications installed on the device 1200, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1206 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1206 can include a display and user input devices such as a keyboard, mouse, and/or trackpad. In some embodiments, I/O subsystem 1206 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1202) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1206 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1200 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for configuring antennas of a mobile device to receive signals from a global navigation satellite system (GNSS) network, the method comprising performing, by the mobile device:

tuning, via a tuning bank of the mobile device, a first antenna element of the mobile device to a first tuning state during an acquisition mode, the acquisition mode for establishing communication channels with a plurality of satellites of the GNSS network, wherein the first tuning state includes having the first antenna element tuned to a first frequency range, wherein the mobile device is limited to receive first signals in a with frequencies within the first frequency range while the first antenna element is tuned to the first frequency range;

establishing the communication channels using the first antenna element in the first tuning state during the acquisition mode;

transitioning from the acquisition mode to a tracking mode based at least in part on the communication channels being established using the first antenna element, the tracking mode for determining locations of the mobile device;

tuning, via the tuning bank, the first antenna element or a second antenna element of the mobile device to a second frequency range for the tracking mode, wherein the mobile device is limited to receive second signals with frequencies within the second frequency range while the first antenna element or the second antenna element is tuned to the second frequency range; and during the tracking mode, determining, based on at least one signal from the GNSS network, a location of the mobile device;

(1) using the first antenna element and the second antenna element to receive the at least one signal from the GNSS network; or (2) not using the first antenna element and using the second antenna element to receive the at least one signal from the GNSS network.

2. The method of claim 1, wherein the location of the mobile device is determined (1) using the first antenna element and the second antenna element of the mobile device to receive the at least one signal from the GNSS network.

3. The method of claim 1, wherein the location of the mobile device is determined (2) not using the first antenna element and using the second antenna element to receive the at least one signal from the GNSS network.

4. The method of claim 1, wherein the first signals with frequencies within the first frequency range are L1 signals.

5. The method of claim 1, wherein the second signals with frequencies within the second frequency range are L5 signals.

6. The method of claim 1, wherein establishing the communication channels comprises using L1 signals from the plurality of satellites to establish the communication channels.

7. The method of claim 1, further comprising:

in response to failing to determine an updated location of the mobile device during the tracking mode, transitioning from the tracking mode to the acquisition mode; and tuning, via the tuning bank, the first antenna element of the mobile device to the first tuning state.

8. The method of claim 1, wherein transitioning from the acquisition mode to the tracking mode comprises:

determining, by a thermal manager of the mobile device, that the mobile device is in a low power mode;

turning off, by the thermal manager, a first radio frequency chain that is configured to process signals with frequencies in the first frequency range based at least in part on determining that the mobile device is in the low power mode; and turning on, by the thermal manager, a second radio frequency chain that is configured to process signals with frequencies in the second frequency range based at least in part on determining that the mobile device is in the low power mode.

9. The method of claim 1, further comprising:

determining, by a thermal manager of the mobile device, that the mobile device is in a low power mode;

tuning, via the tuning bank, the first antenna element of the mobile device to the first tuning state; and determining an updated location of the mobile device using the first antenna element tuned to the first tuning state.

10. The method of claim 1, further comprising:

determining that the mobile device is in a thermal state;

tuning, via the tuning bank, the first antenna element of the mobile device to the first tuning state; and determining an updated location of the mobile device using the first antenna element tuned to the first tuning state.

11. The method of claim 10, wherein determining that the mobile device is in the thermal state comprises:

determining one or more thermal inputs for the mobile device;

providing the one or more thermal inputs as input to a model;

receiving a probability that the mobile device is in the thermal state as output from the model; and classifying the mobile device as being in the thermal state in response to the probability exceeding a threshold.

12. The method of claim 11, wherein the one or more thermal inputs comprises one or more of:

a device temperature with a magnitude that is within a threshold distance of a temperature threshold;

an application executing on the mobile device;

one or more higher order derivatives of the device temperature;

a weather forecast at the location; and a frequency of user interactions with the mobile device.

13. A computing device, comprising:

one or more memories; and one or more processors in communication with the one or more memories and configured to execute instructions stored in the one or more memories to:

tune, via a tuning bank of a mobile device, a first antenna element of the mobile device to a first tuning state during an acquisition mode, the acquisition mode for establishing communication channels with a plurality of satellites of a global navigation satellite system (GNSS) network, wherein the first tuning state includes having the first antenna element tuned to a first frequency range, wherein the mobile device is limited to receive first signals in a with frequencies within the first frequency range while the first antenna element is tuned to the first frequency range;

establish the communication channels using the first antenna element in the first tuning state during the acquisition mode;

transition from the acquisition mode to a tracking mode based at least in part on the communication channels being established using the first antenna element, the tracking mode for determining locations of the mobile device;

tune, via the tuning bank, the first antenna element or a second antenna element of the mobile device to a second frequency range for the tracking mode, wherein the mobile device is limited to receive second signals with frequencies within the second frequency range while the first antenna element or the second antenna element is tuned to the second frequency range; and during the tracking mode, determine, based on at least one signal from the GNSS network, a location of the mobile device;

(1) using the first antenna element and the second antenna element to receive the at least one signal from the GNSS network; or (2) not using the first antenna element and using the second antenna element to receive the at least one signal from the GNSS network.

14. The computing device of claim 13, wherein the one or more processors are configured to:

in response to failing to determine an updated location of the mobile device during the tracking mode, transition from the tracking mode to the acquisition mode; and tune, via the tuning bank, the first antenna element of the mobile device to the first tuning state.

15. The computing device of claim 13, wherein the one or more processors are configured to:

determine, by a thermal manager of the mobile device, that the mobile device is in a low power mode;

turn off, by the thermal manager, a first radio frequency chain that is configured to process signals with frequencies in the first frequency range based at least in part on determining that the mobile device is in the low power mode; and turn on, by the thermal manager, a second radio frequency chain that is configured to process signals with frequencies in the second frequency range based at least in part on determining that the mobile device is in the low power mode.

16. The computing device of claim 13, wherein the one or more processors are configured to:

determine, by a thermal manager of the mobile device, that the mobile device is in a low power mode;

tune, via the tuning bank, the first antenna element of the mobile device to the first tuning state; and determine an updated location of the mobile device using the first antenna element tuned to the first tuning state.

17. A computer-readable medium storing a plurality of instructions that, when executed by one or more processors of a computing device, cause the one or more processors to:

tune, via a tuning bank of a mobile device, a first antenna element of the mobile device to a first tuning state during an acquisition mode, the acquisition mode for establishing communication channels with a plurality of satellites of a global navigation satellite system (GNSS) network, wherein the first tuning state includes having the first antenna element tuned to a first frequency range, wherein the mobile device is limited to receive first signals with frequencies within the first frequency range while the first antenna element is tuned to the first frequency range;

establish the communication channels using the first antenna element in the first tuning state during the acquisition mode;

transition from the acquisition mode to a tracking mode based at least in part on the communication channels being established using the first antenna element, the tracking mode for determining locations of the mobile device; and tune, via the tuning bank, the first antenna element or a second antenna element of the mobile device to a second frequency range for the tracking mode, wherein the mobile device is limited to receive second signals with frequencies within the second frequency range while the first antenna element or the second antenna element is tuned to the second frequency range; and during the tracking mode, determine, based on at least one signal from the GNSS network, a location of the mobile device;

(1) using the first antenna element and the second antenna element to receive the at least one signal from the GNSS network; or (2) not using the first antenna element and using the second antenna element to receive the at least one signal from the GNSS network.

18. The computer-readable medium of claim 17, wherein the plurality of instructions cause the one or more processors to:

in response to failing to determine an updated location of the mobile device during the tracking mode, transition from the tracking mode to the acquisition mode; and tune, via the tuning bank, the first antenna element of the mobile device to the first tuning state.

19. The computer-readable medium of claim 17, wherein the plurality of instructions cause the one or more processors to:

determine, by a thermal manager of the mobile device, that the mobile device is in a low power mode;

turn off, by the thermal manager, a first radio frequency chain that is configured to process signals with frequencies in the first frequency range based at least in part on determining that the mobile device is in the low power mode; and turn on, by the thermal manager, a second radio frequency chain that is configured to process signals with frequencies in the second frequency range based at least in part on determining that the mobile device is in the low power mode.

20. The computer-readable medium of claim 17, wherein the plurality of instructions cause the one or more processors to:

determine, by a thermal manager of the mobile device, that the mobile device is in a low power mode;

tune, via the tuning bank, the first antenna element of the mobile device to the first tuning state; and determine an updated location of the mobile device using the first antenna element tuned to the first tuning state.

* * * * *